US009533740B2

(12) United States Patent
Brennan et al.

(10) Patent No.: US 9,533,740 B2
(45) Date of Patent: Jan. 3, 2017

(54) ADAPTABLE MODULAR POWER SYSTEM (AMPS)

(71) Applicant: Liquid Robotics, Inc., Sunnyvale, CA (US)

(72) Inventors: John M. Brennan, Half Moon Bay, CA (US); Casper G. Otten, Santa Clara, CA (US); David B. Walker, Fremont, CA (US)

(73) Assignee: Liquid Robotics, Inc., Sunnyvale, CA (US)

( * ) Notice: Subject to any disclaimer, the term of this patent is extended or adjusted under 35 U.S.C. 154(b) by 446 days.

(21) Appl. No.: 14/215,062

(22) Filed: Mar. 17, 2014

(65) Prior Publication Data
US 2014/0284998 A1 Sep. 25, 2014

Related U.S. Application Data

(60) Provisional application No. 61/809,713, filed on Apr. 8, 2013, provisional application No. 61/800,514, filed on Mar. 15, 2013.

(51) Int. Cl.
B60L 1/00 (2006.01)
B63B 35/00 (2006.01)
B63H 21/17 (2006.01)

(52) U.S. Cl.
CPC .......... B63B 35/00 (2013.01); B63B 2035/007 (2013.01); B63H 2021/171 (2013.01); Y02T 70/5245 (2013.01)

(58) Field of Classification Search
CPC ...................................... B63B 35/00
USPC .......................................... 307/9.1
See application file for complete search history.

(56) References Cited

U.S. PATENT DOCUMENTS

| 986,627 A | 3/1911 | Pisher |
| 1,315,267 A | 9/1919 | White |
| 2,520,804 A | 8/1950 | Hollar |
| 3,312,186 A | 4/1967 | Litsheim |
| 3,453,981 A | 7/1969 | Gause |

(Continued)

FOREIGN PATENT DOCUMENTS

| DE | 202008013757 U1 | 3/2010 |
| EP | 1641066 A2 | 3/2006 |

(Continued)

OTHER PUBLICATIONS

International Search Report and Written Opinion for PCT Application No. PCT/US2014/030396 mailed Oct. 14, 2014, 17 pages.

(Continued)

Primary Examiner — Stephen W Jackson
(74) Attorney, Agent, or Firm — Kilpatrick Townsend & Stockton LLP

(57) ABSTRACT

An adaptable modular power system (AMPS) is hierarchical in a number of ways. AMPS modules connect to a backplane, and one or multiple AMPS backplanes can form an AMPS domain. At the same time, the vehicle electronics is modular, with various payload boxes needing to communicate with each other. A common power and signaling cable is provided to interconnect payload boxes. A dedicated connector system is also provided so that AMPS modules may communicate, control, receive data, and supply and receive power.

20 Claims, 25 Drawing Sheets

(56) References Cited

U.S. PATENT DOCUMENTS

| | | | |
|---|---|---|---|
| 3,508,516 A | | 4/1970 | Root |
| 3,845,733 A | | 11/1974 | Jackman |
| 3,872,819 A | | 3/1975 | Pickens |
| 3,928,967 A | | 12/1975 | Salter |
| 4,332,571 A | | 6/1982 | Jakobsen |
| 4,371,347 A | | 2/1983 | Jakobsen |
| 4,389,843 A | | 6/1983 | Lamberti |
| 4,598,547 A | | 7/1986 | Danihel |
| 4,684,350 A | | 8/1987 | DeLima |
| 4,842,560 A | | 6/1989 | Lee |
| 4,968,273 A | | 11/1990 | Momot |
| 5,084,630 A | | 1/1992 | Azimi |
| 5,273,443 A | | 12/1993 | Frantz et al. |
| 5,577,942 A | | 11/1996 | Juselis |
| 5,726,506 A | * | 3/1998 | Wood .................. H02B 1/24 307/147 |
| 5,945,746 A | * | 8/1999 | Tracewell .......... H05K 7/20572 165/104.33 |
| 6,099,368 A | | 8/2000 | Gorshkov |
| 6,192,239 B1 | * | 2/2001 | Lee .................. H04W 36/14 455/421 |
| 6,561,856 B1 | | 5/2003 | Gorshkov |
| 6,665,189 B1 | | 12/2003 | Lebo |
| 7,301,925 B2 | * | 11/2007 | Fan .................. H04W 4/185 370/338 |
| 7,371,136 B2 | | 5/2008 | Hine et al. |
| 7,634,329 B2 | * | 12/2009 | Liu ................ G05B 23/0213 700/292 |
| 8,043,133 B2 | | 10/2011 | Hine et al. |
| 8,668,534 B2 | | 3/2014 | Hine et al. |
| 8,808,041 B2 | | 8/2014 | Hine et al. |
| 8,825,241 B2 | | 9/2014 | Hine et al. |
| 8,944,866 B2 | | 2/2015 | Hine et al. |
| 2002/0178990 A1 | | 12/2002 | McBride et al. |
| 2003/0220027 A1 | | 11/2003 | Gorshkov |
| 2004/0102107 A1 | | 5/2004 | Gorshkov |
| 2007/0051292 A1 | | 3/2007 | Kilbourn et al. |
| 2009/0218984 A1 | | 9/2009 | Parakulam |
| 2011/0059638 A1 | | 3/2011 | Sandwith |
| 2011/0174210 A1 | | 7/2011 | Craig |
| 2012/0285160 A1 | | 11/2012 | Hine et al. |
| 2012/0295499 A1 | | 11/2012 | Hine |
| 2013/0006445 A1 | | 1/2013 | Hine |
| 2013/0059488 A1 | | 3/2013 | Hine et al. |
| 2013/0068153 A1 | | 3/2013 | Hine |
| 2013/0102207 A1 | | 4/2013 | Hine et al. |
| 2014/0038477 A1 | | 2/2014 | Hine et al. |
| 2014/0263851 A1 | | 9/2014 | Hine et al. |
| 2014/0283726 A1 | | 9/2014 | Ong et al. |
| 2014/0290233 A1 | | 10/2014 | Hine et al. |
| 2014/0335747 A1 | | 11/2014 | Hine et al. |

FOREIGN PATENT DOCUMENTS

| | | |
|---|---|---|
| WO | 87/04401 A1 | 7/1987 |
| WO | 94/10029 A1 | 5/1994 |
| WO | 0036726 A1 | 6/2000 |
| WO | 2007/087197 A2 | 8/2007 |
| WO | 2008/109002 A2 | 9/2008 |
| WO | 2013/003640 A1 | 1/2013 |

OTHER PUBLICATIONS

U.S. Appl. No. 14/215,085, filed Mar. 17, 2014 by Ong et al. (unpublished).

Partial Supplementary European search report, Application No. 14765538.5-1804/0969657, PCT/US2014030396, dated Sep. 22, 2016, 7 pages.

* cited by examiner

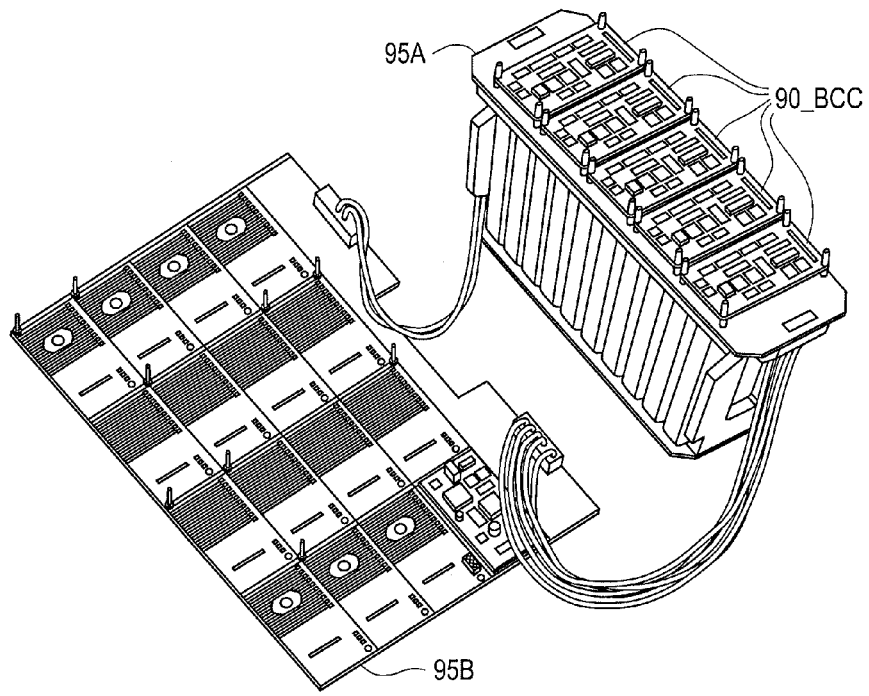
FIG. 9
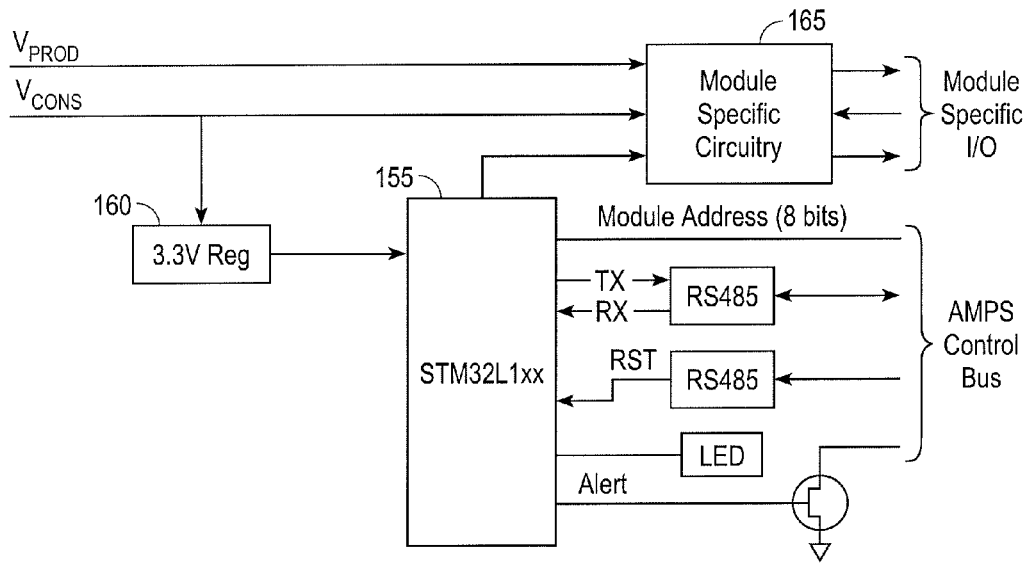
FIG. 10 – Generic Module Control Architecture

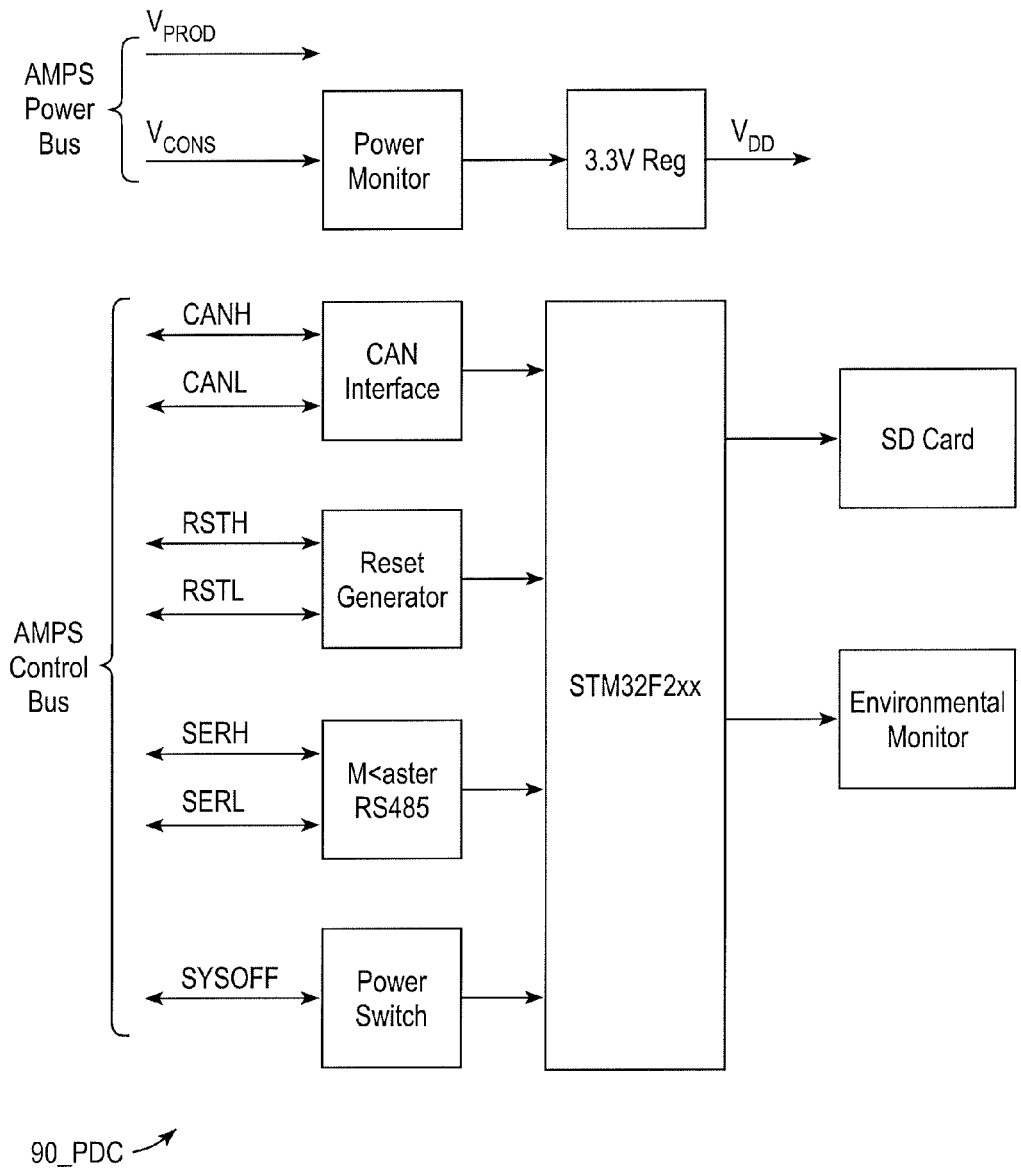
FIG. 11 – Power Domain Controller

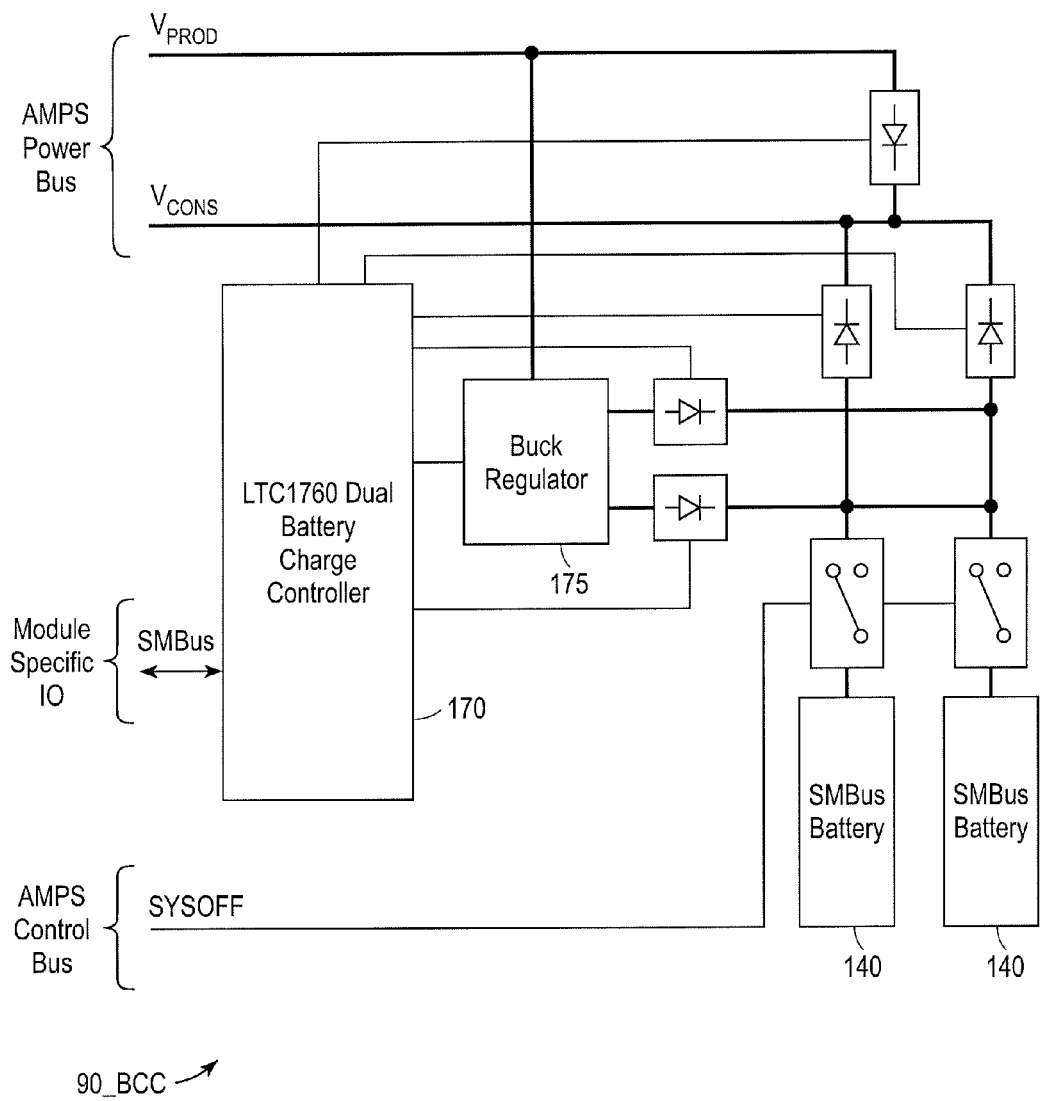
FIG. 12 – Battery Charger Control Module

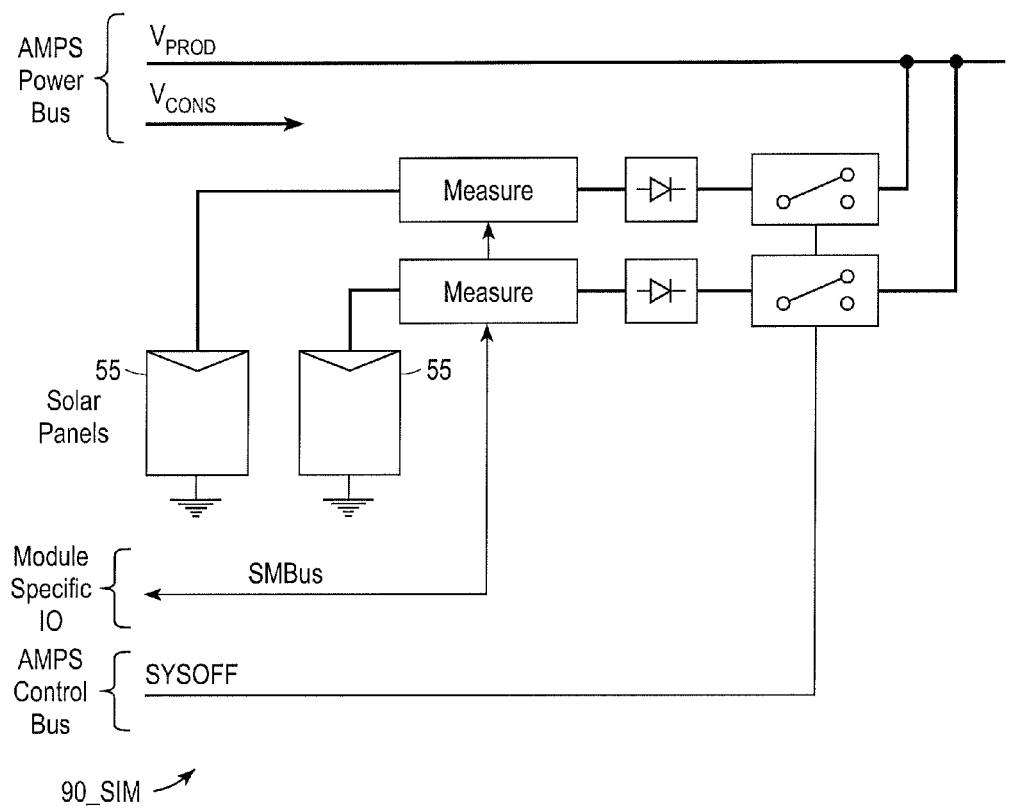
FIG. 13 – Solar Input Module
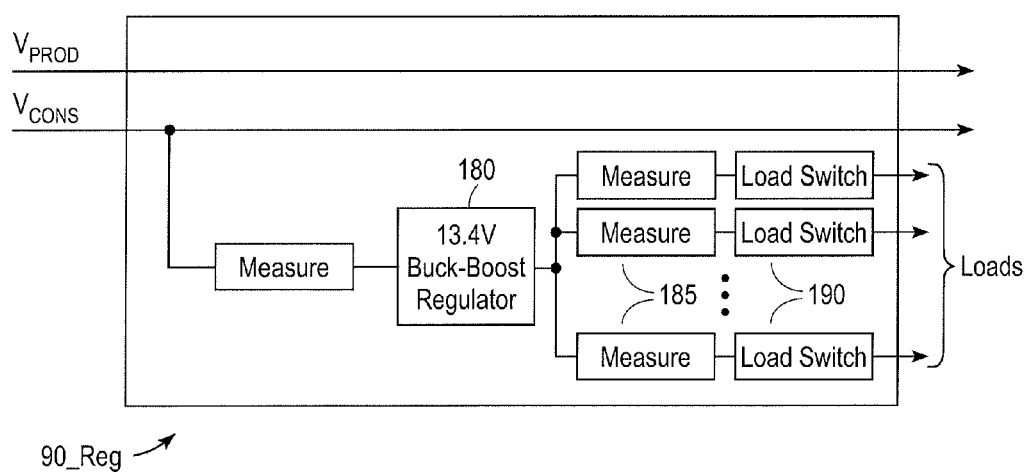
FIG. 14 – 13.4V Regulator Module

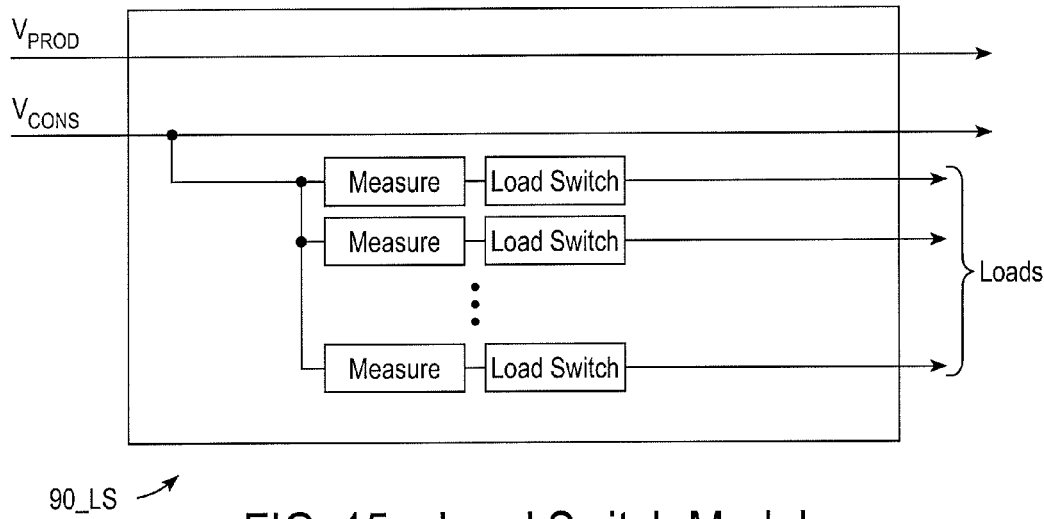
FIG. 15 – Load Switch Module
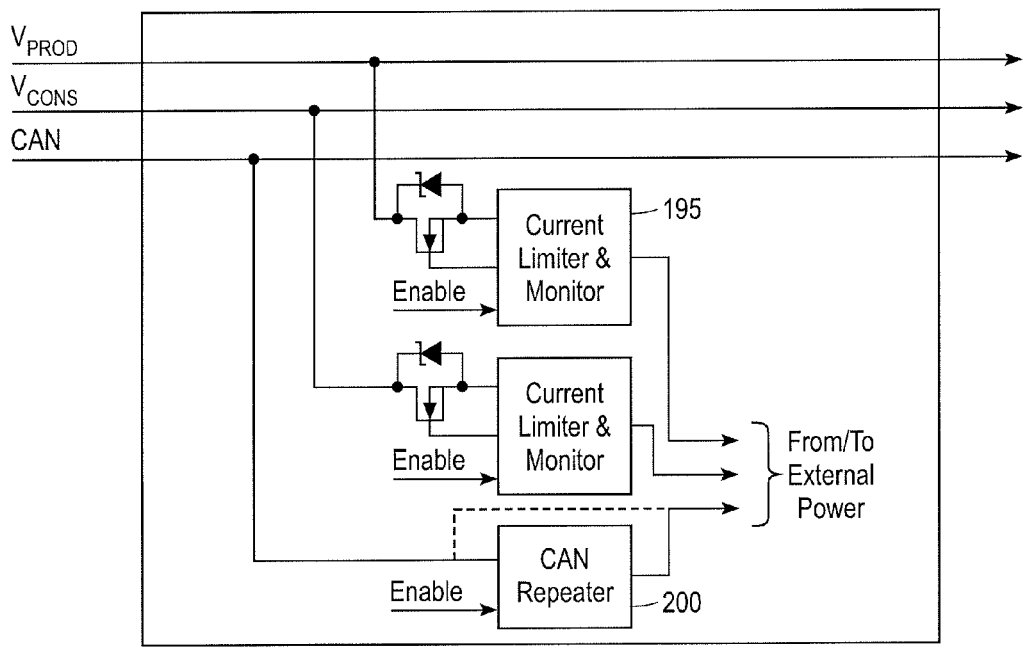
NOTE: Input bridges bypass the CAN repeater (dotted line).
Output bridges must use the CAN repeater.
FIG. 16 – Bridge Module

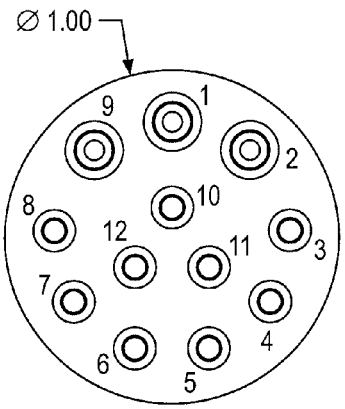
FIG. 23A
| Pin | Signal | Termination |
|---|---|---|
| 2 | VCONS | AMPS Bridge VCONS |
| 9 | VPROD | AMPS Bridge VPROD |
| 1 | GND | System ground plane |
| 3 | CANH | AMPS Bridge CANH_PRI |
| 4 | CANL | AMPS Bridge CANL_PRI |
| 5 | TX+ | Ethernet Switch |
| 6 | TX- | Ethernet Switch |
| 7 | RX+ | Ethernet Switch |
| 8 | RX- | Ethernet Switch |
| 11 | SPARE1 | Interconnect Matrix |
| 12 | SPARE2 | Interconnect Matrix |
| 10 | Shield | System ground plane |
FIG. 23B
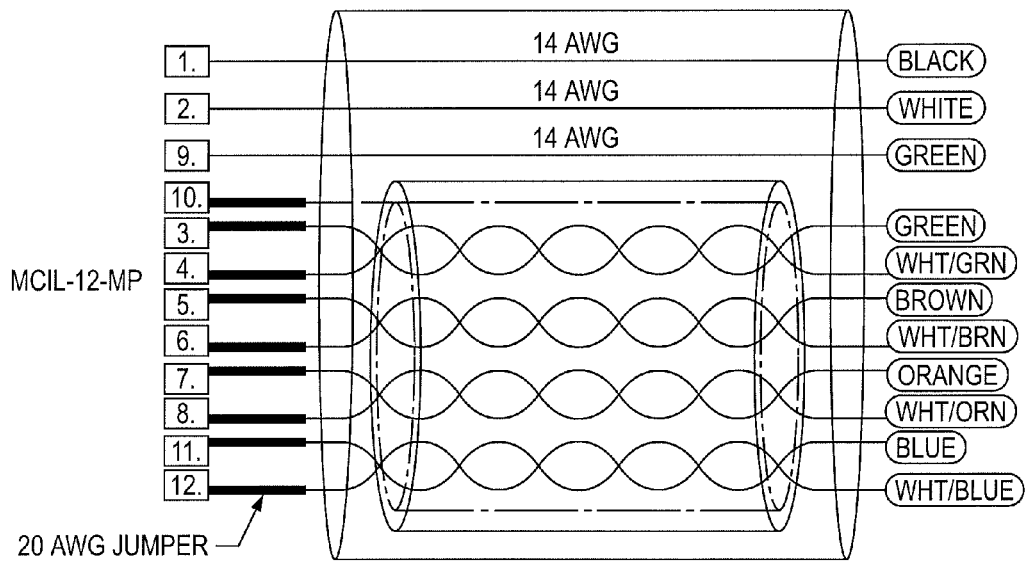
FIG. 24

ADAPTABLE MODULAR POWER SYSTEM (AMPS)

CROSS REFERENCE TO RELATED APPLICATION

This application claims priority from the following U.S. patent applications:

Application No. 61/809,713, filed Apr. 8, 2013 for "Adaptable Modular Power System (AMPS) and Dedicated Connector" (inventors John M. Brennan, Casper G. Otten, and David B. Walker); and Application No. 61/800,514, filed Mar. 15, 2013 for "Adaptable Modular Power System (AMPS)" (inventors John M. Brennan, Casper G. Otten, and David B. Walker).

This application is being filed on the same date as application Ser. No. 14/215,085, filed Mar. 17, 2014 for "Modular Payload Boxes and Autonomous Water Vehicle Configured to Accept Same" (inventors Timothy James Ong and Daniel Peter Moroni)

The entire disclosures (including any appendices) of all the above mentioned applications are hereby incorporated by reference for all purposes.

BACKGROUND OF THE INVENTION

This invention relates to power distribution and management systems, connector systems, and payload boxes for autonomous water vehicles. In the exemplary embodiment, the power distribution and management system, connector systems, and payload boxes are deployed in an autonomous wave-powered vehicles ("WPV"), which is a device that is subject to waves in the water, and that in some cases utilizes the power of waves in water for propulsion.

As a wave travels along the surface of water, it produces vertical motion, but no net horizontal motion, of water. The amplitude of the vertical motion decreases with depth; at a depth of about half the wavelength, there is little vertical motion. The speed of currents induced by wind also decreases sharply with depth. A number of proposals have been made to utilize wave power to do useful work. Reference may be made, for example, to U.S. Pat. Nos. 986,627, 1,315,267, 2,520,804, 3,312,186, 3,453,981, 3,508,516, 3,845,733, 3,872,819, 3,928,967, 4,332,571, 4,371,347, 4,389,843, 4,598,547, 4,684,350, 4,842,560, 4,968,273, 5,084,630, 5,577,942, 6,099,368 and 6,561,856, U.S. Publication Nos. 2003/0220027 and 2004/0102107, and International Publication Nos. WO 1987/04401 and WO 1994/10029. The entire disclosure of each of those patents and publications is incorporated herein by reference for all purposes.

Many of the known WPVs comprise (1) a float, (2) a swimmer (referred to also as a sub or a glider, and (3) a tether (referred to also as an umbilical) connecting the float and the sub. The float, sub, and umbilical are such that when the vehicle is in still water, (i) the float is on or near the surface of the water, (ii) the sub is submerged below the float, and (iii) the umbilical is under tension. The sub comprises a fin or other wave-actuated component which, when the device is in wave-bearing water, interacts with the water to generate forces that can be used for a useful purpose, for example to move the sub in a direction having a horizontal component (hereinafter referred to simply as "horizontally" or "in a horizontal direction"). The terms "wing" and "fin" are used interchangeably in the art and in this application.

It is desirable to position sensors and equipment in the ocean or lakes for long periods of time without using fuel or relying on anchor lines which can be very large and difficult to maintain. In recent years, the WPVs developed by Liquid Robotics, Inc. and marketed under the registered trademark Wave Glider®, have demonstrated outstanding value, particularly because of their ability to operate autonomously. It is noted that Wave Glider® WPVs are often referred to as Wave Gliders as a shorthand terminology.

SUMMARY OF THE INVENTION

Embodiments provide an adaptable modular power system, often referred to as AMPS (Adaptable Modular Power System). AMPS is the next-generation power system for the Wave Glider®, but could be used in any autonomous water vehicle. AMPS is designed to supply relatively large amounts of power to various instrumentation and sensors so nearly any instrument or sensor can be integrated into the vehicle (from a power perspective). Examples of high-power sensors and instruments include software-defined radio receivers and transceivers, SONAR systems, and BGAN satellite systems. These types of sensors can be electrically integrated into the system efficiently with a minimal amount of electronics design effort through reuse of power modules.

In an aspect of the invention, a power system for an autonomous water vehicle comprises: a three-line power bus having a producer voltage line, a consumer voltage line, and a ground line; and a plurality of modules, referred to as AMPS modules, with each AMPS module being coupled to the power bus. The AMPS modules include at least one module chosen from the set that includes: consumer modules having circuitry for coupling an electrical load to the consumer voltage line; producer modules having circuitry for coupling an electrical power source to the producer voltage line; and bridge modules having circuitry for coupling to the producer and consumer voltage lines and for limiting outbound current on corresponding producer and consumer voltage output lines.

The AMPS modules are distributed over a number of power domains, and each power domain includes a bridge module for coupling the power bus in that power domain to a different power domain, with the bridge module also providing signaling to the different power domain.

In some embodiments, the different power domains are located in separate waterproof payload boxes, and the power bus and signaling are communicated between power domains using a waterproof cable.

In another aspect of the invention, a power system for an autonomous water vehicle comprises: a three-line power bus having a producer voltage line, a consumer voltage line, and a ground line; a backplane carrying the power bus and including a plurality of connectors; and a plurality of modules, referred to as AMPS modules, with each AMPS module being coupled to the backplane. The AMPS modules include at least one module chosen from the set that includes: consumer modules having circuitry for coupling an electrical load to the consumer voltage line; producer modules having circuitry for coupling an electrical power source to the producer voltage line; and energy storage modules having circuitry for coupling to the producer voltage line to charge an energy source, and circuitry for coupling to the consumer voltage line to return stored energy to the consumer voltage line.

In embodiments of the present invention having an energy storage module, the energy storage module could be a battery charger module that has circuitry for: coupling to the producer voltage line to charge a battery; and coupling to the consumer voltage line to OR the battery voltage onto the consumer voltage line.

In embodiments of the present invention, the backplanes are passive. Complex electronic circuits are implemented on the modules, and high-power paths are implemented on the backplane.

In embodiments where there are multiple power domains, the set of modules can further include bridge modules having circuitry for coupling to the producer and consumer voltage lines and for limiting outbound current on corresponding producer and consumer voltage output lines.

In an aspect of the invention, a power system for an autonomous water vehicle comprises: a three-line power bus having a producer voltage line, a consumer voltage line, and a ground line; and a plurality of modules, referred to as AMPS modules, with each AMPS module being coupled to the power bus. The AMPS modules include at least one consumer module having circuitry for coupling an electrical load to the consumer voltage line.

In an aspect of the invention, a power system for an autonomous water vehicle comprises: a three-line power bus having a producer voltage line, a consumer voltage line, and a ground line; and a plurality of modules, referred to as AMPS modules, with each AMPS module being coupled to the power bus. The AMPS modules include at least one producer module having circuitry for coupling an electrical power source to the producer voltage line.

In an aspect of the invention, a power system for an autonomous water vehicle comprises: a three-line power bus having a producer voltage line, a consumer voltage line, and a ground line; and a plurality of modules, referred to as AMPS modules, with each AMPS module being coupled to the power bus. The AMPS modules include at least one bridge module having circuitry for coupling to the producer and consumer voltage lines and for limiting outbound current on corresponding producer and consumer voltage output lines.

In other broader aspects of the invention, the set of modules can be consumer modules, or the set of modules can be producer modules, or the set of modules can be energy storage modules.

In any of the above aspects of the invention, the modules couple to connectors on a backplane where the plurality of connectors are arranged on a grid, and the modules are implemented on circuit boards having sizes compatible with the grid spacing.

A further understanding of the nature and advantages of the present invention may be realized by reference to the remaining portions of the specification and the drawings, which are intended to be exemplary and not limiting.

BRIEF DESCRIPTION OF THE DRAWINGS

FIG. 9 shows a backplane populated by five battery charge controller modules and connected to a CCU backplane;

FIG. 10 is a block diagram depicting a generic control architecture for AMPS modules;

FIG. 11 is a block diagram of a power domain controller ("PDC") module;

FIG. 12 is a block diagram of a battery charge controller ("BCC") module;

FIG. 13 is a block diagram of a solar input module ("SIM");

FIG. 14 is a block diagram of a 13.4V regulator module;

FIG. 15 is a block diagram of a load switch module;

FIG. 16 is a block diagram of a bridge module;

FIG. 23A is a cross section or surface view of the housing of the male connector across the plane from which the pins project, showing insulative cladding near the base of the pin that forms a waterproof seal with the corresponding receiving member of the female connector;

FIG. 23B is a chart showing the pinout assignment for the pin arrangement shown in FIG. 23A;

FIG. 24 is a schematic depiction of electrical lines within the housing;

DESCRIPTION OF SPECIFIC EMBODIMENTS

List of Acronyms

| | |
|---|---|
| AMPS | Adaptable Modular Power System |
| CAN | Controller Area Network |
| CCU | Command and Control Unit |
| PDC | Power Domain Controller |

Autonomous Water Vehicle Overview

Figure 1:
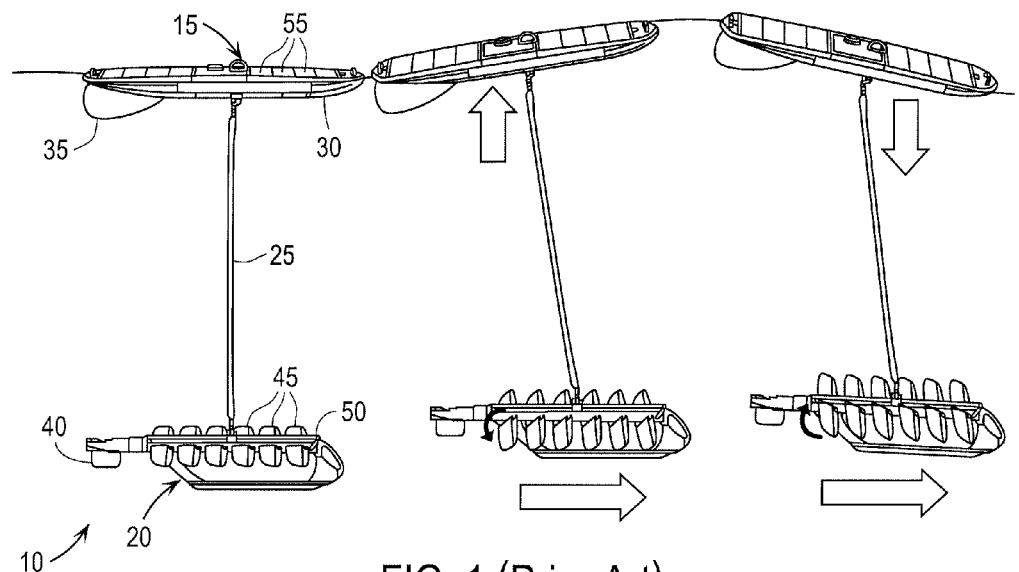
FIG. 1 is a pictorial view showing the operation of a prior art wave-powered vehicle ("WPV") in still water (fins/wings in neutral position), when a wave lifts the float (up-stroke), and when the WPD sinks into the wave trough (down-stroke)

FIG. 1 is a side view showing three images of a wave-powered water vehicle 10. The vehicle comprises a "float" 15 resting on the water surface, and a "sub" or "glider" 20 hanging below, suspended by a tether 25. The float 15 comprises a displacement hull 30 and a fixed keel fin 35. The sub comprises a rudder 40 for steering and "wings" or "fins" 45 connected to a central beam of a rack 50 so as to permit rotation of the wings around a transverse axis within a constrained range, and provide propulsion. Vehicle 10 carries a number of solar panels 55 on its upper surface to provide power to the vessel, as will be described in detail below.

In still water (shown in the leftmost panel), the submerged sub 20 hangs level by way of tether 25 directly below float 15. As a wave lifts float 15 (middle panel), an upwards force is generated on the tether 25, pulling sub 20 upwards through the water. This causes wings 45 of the sub to rotate about a transverse axis where the wings are connected to rack 50, and assume a downwards sloping position. As the water is forced downward through the sub, the downwards sloping wings generate forward thrust, and the sub pulls the float forward. After the wave crests (rightmost panel), the float descends into a trough. The sub also sinks, since it is heavier than water, keeping tension on the tether. The wings rotate about the transverse axis the other way, assuming an upwards sloping position. As the water is forced upwards through the sub, the upwards sloping wings generate forward thrust, and the sub again pulls the float forwards.

Thus, the sub generates forward thrust both when it is ascending and when it is descending, resulting in forward motion of the entire vehicle.

Adaptable Modular Power System ("AMPS") Overview

An autonomous water vehicle is capable of carrying instrumentation for long-term observation of various metrics in the world's oceans. Useful oceanographic instruments typically require electrical power for their operation. Because of the long-term duration of missions and the platform's finite size, the system-wide power resources are limited. Therefore, efficient methods to collect and distribute electrical energy are needed. Further, sensor power requirements can vary wildly and the power system should adapt to these needs.

Waterproof connectors are used to interconnect different instrumentation clusters. These clusters are housed in separate drybox enclosures (sometimes referred to as payload boxes) to minimize the effects of a possible leak. These waterproof connectors are expensive, so the number of this type of connection should be minimized. Finally, it is desirable that sensors can be added to the platform easily. Further, sensors and actuators can reside on the sub, and conductors housed in the umbilical provide electrical connections between the float and the sub.

Payload boxes can contain the vessel's command and control unit ("CCU"), customer-supplied electronics, and auxiliary power packs (e.g., battery packs). As will be described below, these payload boxes can be modular so as to facilitate rapid configuration and reconfiguration (e.g., upgrades) of the vessel electronics. This modularity of the payload boxes is not required for AMPS operation, and is a separate type of modularity from that provided by AMPS.

In short, AMPS provides a set of modules that interface power sources, energy storage devices, and loads (power consuming devices) to a 3-wire power distribution bus (often referred to simply as the "power bus") so that power can be efficiently collected, stored, and distributed. Within a given system, the AMPS modules can be, and often are, divided into groups referred to as power domains. This division can parallel a functional division of system components on the water vehicle. For example, the deployment of functional elements in separate payload boxes can lead to a corresponding mapping of the AMPS modules for those functional elements into separate power domains.

The collection of modules used within a power domain determines its function. Examples of the functions performed with different modules are:

solar charging control;
power domain control;
voltage regulation;
battery charging; and
Power domain bridging.

Each of the modules has built-in intelligence to perform its function.

The present implementation of AMPS is designed using 14.4V (4S) lithium-ion batteries, solar panels with an open circuit voltage of 24V (maximum power point (MPP) voltage of 19V), and I/O connectors rated to 10 A of current. Thus the present system is designed to transfer a maximum of 240 W to additional devices (nominally 140 W). Increasing the nominal voltage of the batteries (with a requisite increase in solar panel MPP voltage), and/or increasing the connector current rating will increase the power capacity of the system. For example, a system using 28.8V batteries (with 35V solar panels) and 20 A connectors would be capable of transferring nominally 576 W. Simply adding additional batteries and solar panels increases the energy storage capacity of the system.

An additional feature of AMPS is energy monitoring down to the individual sensor or instrument. Monitoring the individual components allows the user to identify problems if a sensor is drawing too much (or too little) power and also provides the user with accurate knowledge of the power consumed by a particular sensor. This knowledge enables the duty cycle and instrument on-time to be intelligently planned by the sensor and vehicle operator.

AMPS Power Bus and Bus Access

Figure 2:
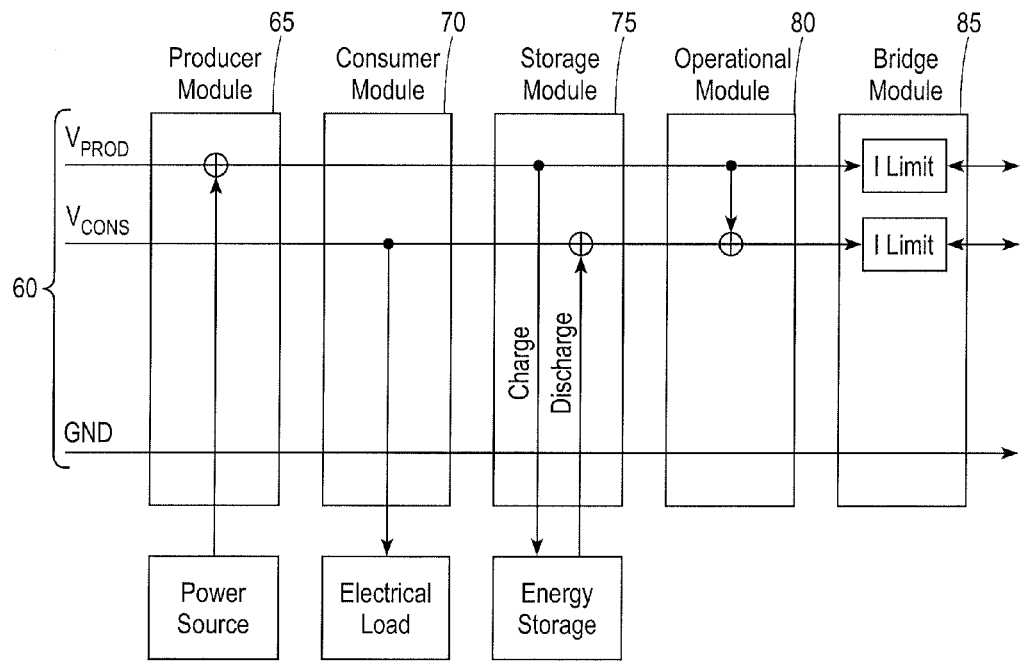
FIG. 2 is an electrical schematic showing a 3-wire power bus that connects AMPS modules and power domains in an embodiment of the present invention.

FIG. 2 is a simplified electrical schematic showing the 3-wire power bus 60 that connects AMPS modules and power domains in an embodiment of the present invention. The three conductors for power bus 60 are denoted $V_{PROD}$, $V_{CONS}$, and ground (or GND). This figure shows a single power domain, and shows a single example of each of a producer module 65, a consumer module 70, a storage module 75, an operational module 80, and bridge module 85. A given power domain may have multiple ones of these types, or may have fewer than all these types. This designation of the modules indicates the ways that the modules access power bus 60, and some modules may perform more than one type of access.

Figure 3:
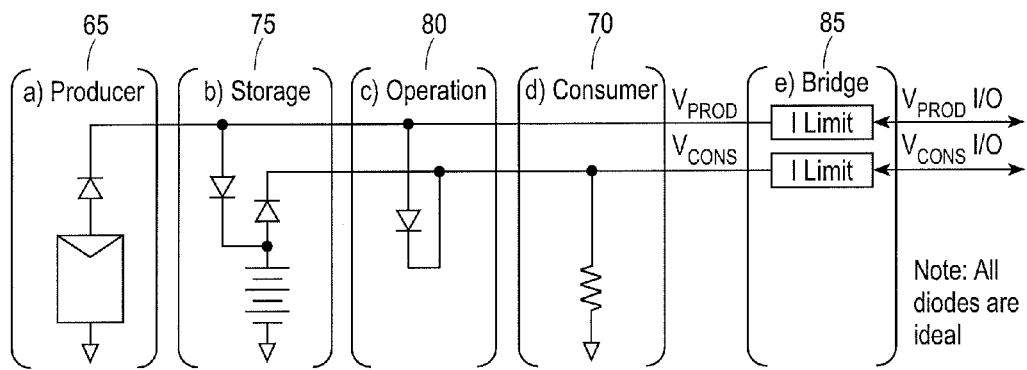
FIG. 3 is an electrical schematic showing how different types of modules access the 3-wire power bus that connects AMPS modules and power domains in an embodiment of the present invention.

FIG. 3 is a simplified electrical schematic showing how the different types of AMPS modules access power bus 60 in an embodiment of the present invention. In this diagram, all diodes are ideal (they conduct with no forward voltage). Note that the implementation of an AMPS module may combine any of the access methods shown in the figure.

Producer access accepts power from a power source, converts the power to a usable form as necessary, and then impresses the collected power onto the bused signal labeled "$V_{PROD}$". Although the usual power source is a set of solar panels, the power source could also include sources such as an external wall charger, fuel cells, or vibrational energy generators. Producer access should be disabled when the system is turned off to prevent accidental activation of the system.

Consumer access takes energy from the bused signal labeled "$V_{CONS}$", converts the energy as necessary, and then provides it to the load. Examples of consumers include the electronics to run the system as well as sensors.

Storage access (typically batteries) takes excess energy from $V_{PROD}$ and stores it for later use (for example charging batteries). This stored energy is returned when required onto $V_{CONS}$ (for example discharging batteries). Storage access should disable $V_{CONS}$ when the system is turned off to prevent accidental activation. From the combination of diodes, it is apparent that batteries may only charge from energy present on $V_{PROD}$ and there is no path that can charge a one battery from another.

Operational access takes energy from $V_{PROD}$ and directs it to $V_{CONS}$. In this way, the incoming energy gathered from producer access is first used to power the system and only the excess collected energy is stored for later use. This is more efficient because it avoids charge/discharge losses.

Bridge access provides bidirectional current-limited switched power transfer between power domains. Current limits on $V_{PROD}$ and $V_{CONS}$ is necessary to protect the connectors interconnecting the domains from potentially damaging over current conditions. Bidirectional access is required so any access type is allowed within any power domain. Isolation of power domains protects AMPS from damage resulting from leaks in downstream AMPS domains. Bridge access should disable accepting power from $V_{CONS}$ and $V_{PROD}$ to prevent accidental system activation.

The diode for operation access allows the producers to power the loads along with the batteries when energy input is less than required to run the loads. The dual arrangement of diodes using storage access makes it so the batteries are charging only using the excess energy used to run the system. If one were to build a system that shorted $V_{PROD}$ and $V_{CONS}$ so as to form a 2-wire bus, it is simple to imagine situations where a low-capacity battery is charged from higher capacity batteries. Scenarios such as this are inefficient because a charge/discharge penalty will occur twice. While these situations could be remedied through software action by disabling charging of low-capacity batteries, the 3-wire power bus avoids these inefficiencies through its topology, leading to a simpler more robust system.

AMPS Modules/Backplane and Power Domains

While AMPS is capable of supporting a wide variety of module types, a current implementation uses the module types set forth in the following table:

TABLE 1

AMPS Module Types

| Name | Description |
| --- | --- |
| Power Domain Controller module (PDC) | Master power control. |
| Battery Charge Controller module (BCC) | Battery charging and load control. |
| Solar Input module (SIM) | Solar input control. |
| 13.4 V Regulator module | A number of power outputs regulated at +13.4 VDC. |
| Load Switch module | A number of power outputs sitting at battery bus voltage that can be switched individually. |
| AMPS Bridge module (BRI) | Delineates power systems, while allowing power to flow unimpeded as long as systems are OK. Allows AMPS communications to cross domains. |

Figure 4:
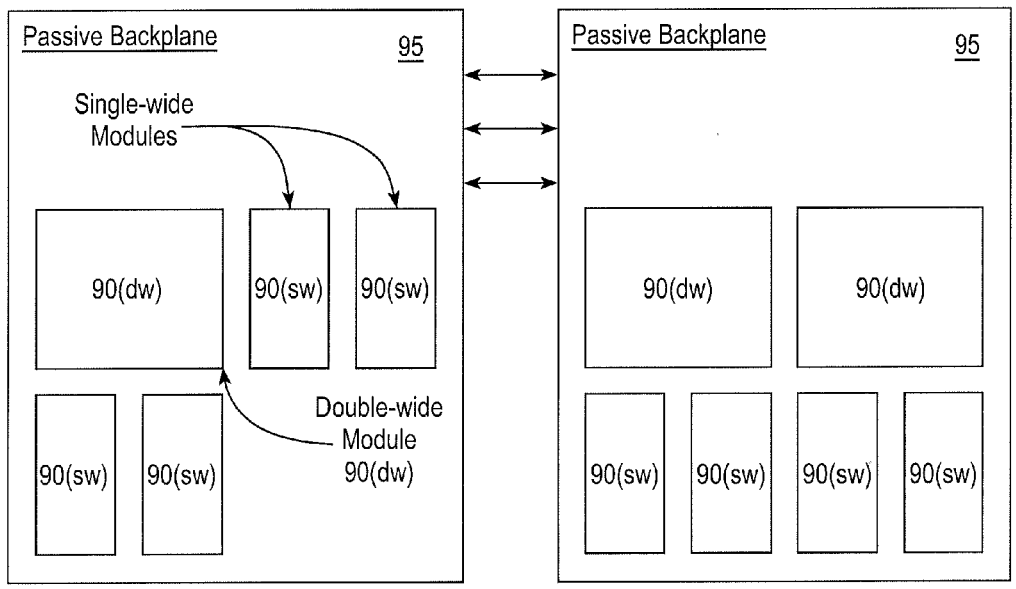
FIG. 4 shows a set of AMPS modules populating a set of interconnected backplanes that form a power domain.

AMPS is hierarchical in two ways. FIG. 4 shows a set of AMPS modules 90 populating a set of interconnected backplanes 95 that form a power domain, and as such illustrates the first type of hierarchy. More specifically, as shown in FIG. 4, individual AMPS modules are connected in parallel on a backplane or group of backplanes 95 to form a power domain. The modules include what can be referred to as base-size modules (or simply base modules) that have a common lateral size, and optionally larger modules. Sometimes, AMPS modules will be referred to by the reference number 90 with a suffix denoting the particular kind of module. For example, a BCC module might be referred to as "module 90_BCC."

Each base module is physically designed with identical dimensions and the backplane connectors are placed in identical locations. This allows any module to fit into any location in the backplane. More complex modules requiring more circuitry than could fit on a base module can be implemented using a circuit board whose size is the same as the area occupied by multiple base modules. This is shown in FIG. 4 as "single-wide" modules 90 (sw) and "double-wide" modules 90 (dw). It is noted that the width of a so-called double-wide module can be up to twice the width of a base module plus the width of the module spacing on the backplane. While specific dimensions are not part of the invention, a specific implementation uses base modules that are 1.90 inches wide by 3.4 inches high (in the orientation shown in the figure), with the modules being placed in a 2D array spaced 2 inches (50.8 mm) horizontally and 3.5 inches (99.9 mm) vertically.

The modules are further designed so that the modules implement all of the active electronics and the backplanes are purely passive circuits. Modules of different types can be plugged into the same backplane resulting in a system with configurable functionality. This scheme promotes design reuse. Not all modules within a power domain directly connect to all three conductors; some only connect to $V_{PROD}$ and GND, while others only connect to $V_{CONS}$ and GND. However, in order to make the backplane truly universal so that any type of module can be plugged into any slot on the backplane, all the backplane connectors can be configured with pins (or sockets) that connect to all three. Then, any module would be able to connect to whatever conductors its functionality requires.

Because the backplanes are simple and passive, they don't require the stringent design rules required by the complex module circuitry, so thicker copper can be used on the backplane, thereby increasing the current capacity of the system. The current capacity can be increased even further through use of bus bars on the backplane. Depending on the application, the AMPS backplanes can be of any desired size. For example, a backplane for use in an auxiliary battery pack could be provided with five slots to accommodate five single-wide battery charge controller modules. On the other hand, a backplane for use in supporting the vehicle's command and control unit ("CCU") electronics could be provided with 16 or 20 slots to accommodate a variety of modules.

Figure 5A:
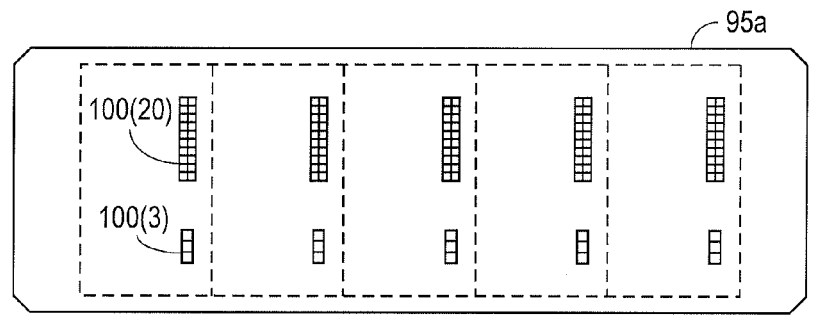
FIG. 5A is a stylized top view of an AMPS backplane having slots to accommodate five modules.
Figure 5B:
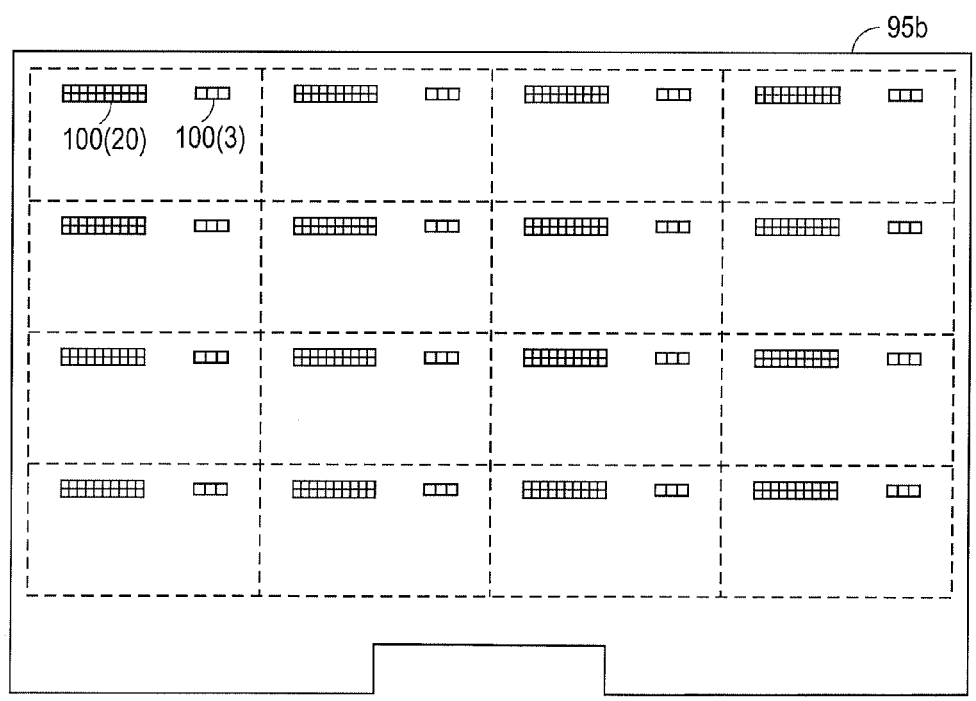
FIG. 5B is a stylized top view of an AMPS backplane having slots to accommodate 16 modules.

FIGS. 5A and 5B are stylized top views of AMPS backplanes 95A and 95B having slots to accommodate five modules and 16 modules, respectively. The dashed grids within the backplane perimeter delineate the regions allotted to the individual modules. As mentioned above, a double-wide module would occupy two such regions. Shown within each module region are two sockets configured to receive corresponding male connectors, a 20-receptacle socket 100 (20) for AMPS logic signals, and a 3-receptacle socket 100(3) for the AMPS 3-wire power bus. They are shown separated to keep the logic signals, which will require a large portion of the top copper layer, away from the power connections. A two-row logic connector is shown, but a single-row connector could be used as well. It is preferred, but not required, that the modules have male connectors (pins) and the backplanes have complementary female connectors.

Figure 6:
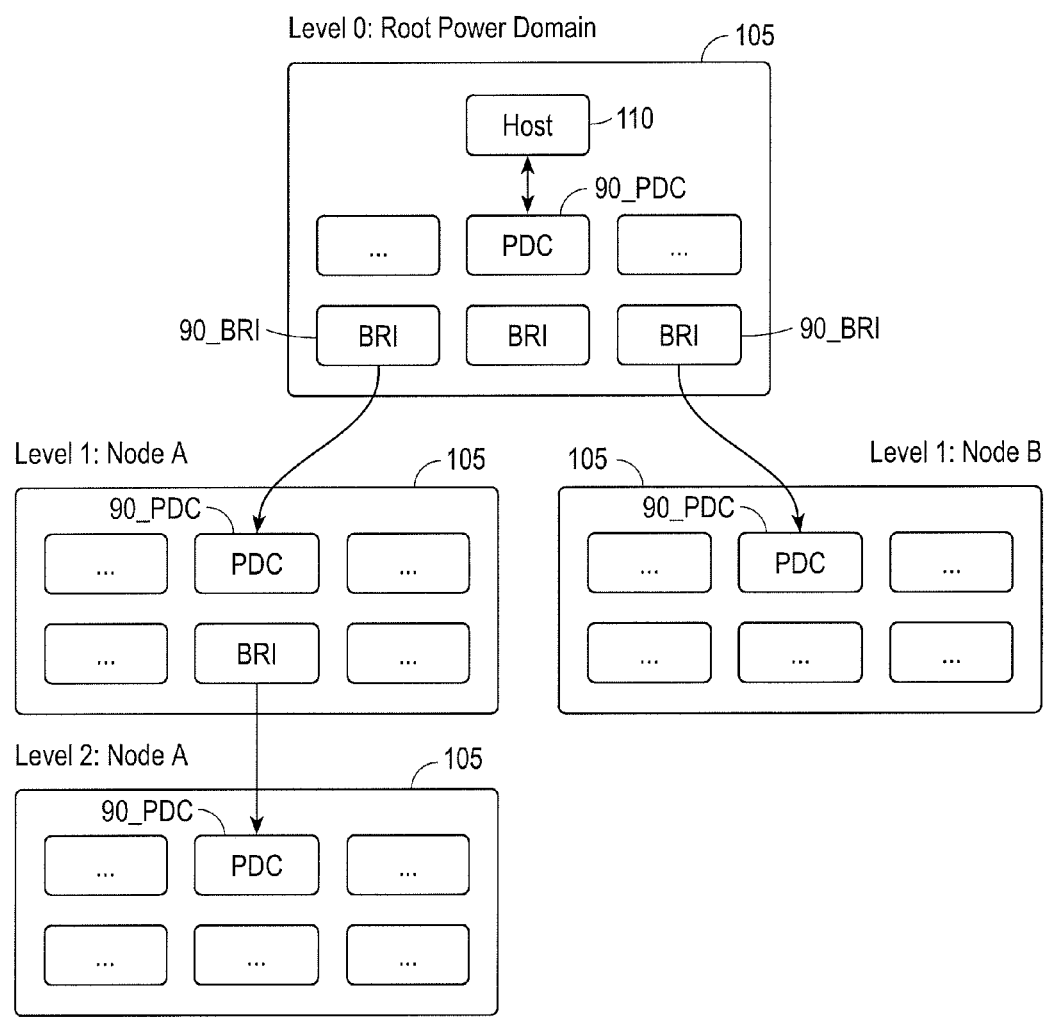
FIG. 6 is a block diagram depicting a hierarchy of multiple power domains.

FIG. 6 is a block diagram depicting a hierarchy of multiple power domains 105, and as such illustrates the second type of hierarchy. More specifically, as shown in FIG. 6, one or more AMPS power domains can be interconnected using a hierarchal tree topology. As will be discussed below, a common power and signaling cable is provided to interconnect power domains. Because the electronics in the float is its own power domain, the same connectors may be used for the umbilical. Typically, but not necessarily, each payload box will be a single power domain. As can be seen, the top-level power domain includes a host 110, and each power domain includes a power domain control ("PDC") module 90_PDC.

Host 110 makes all system-wide power use policies (such as shutting down circuitry when reserve battery power is low), generates requests/queries (state, configuration, data), processes configuration, state, and data, and responds to alarms. The host communicates with the PDC in each power domain, and to optimize system performance and cost, the communications interface from the host to the PDC, and the communications interface from the PDC to the other modules in that PDC's power domain are different. A current design of AMPS relies on a single host, but the design allows for multiple or redundant hosts, possibly to be implemented at a future time.

Host 110 is an external entity to AMPS that both depends on AMPS and gives AMPS direction. It is typically physically located externally to AMPS hardware (AMPS modules and backplanes), although there is nothing that would prevent the host from being mounted on one of the AMPS backplanes. The host needs AMPS to supply power to it and its sensors and instrumentation. It does this through a redundant CAN interface and the appropriate communications protocol. The host is a compute element that has the added responsibility of managing AMPS. As such, it can be implemented as software running on a computing device that is responsible for other functions. In a current implementation, the host is incorporated into the vehicle control computer that is part of the vehicle's CCU electronics.

One PDC is instantiated within each power domain to perform the interface and protocol conversion. The PDC serves as an intermediary between host 110 and the modules that perform the actual functions of the AMPS system. The PDC monitors domain health, collects and aggregates data per configuration, enumerates modules, receives/forwards configuration and state, responds to queries (state configuration, data), and responds to/forwards alarms. The PDC will be described in more detail in the sections below.

Because the power domains are connected through a harsh sea-water environment, it is desirable to electrically isolate external power domains. Both power and control signals are isolated by switching off power and communications through another special module 90_BRI called a bridge. The bridge will be described in more detail in the sections below. For simplicity, bridges are shown as directly communicating with PDCs, but each domain would normally have a bridge at each connection to another domain, so the communication is from bridge to bridge.

AMPS modules are connected within a power domain using two types of buses: the 3-wire power distribution bus ($V_{PROD}$, $V_{CONS}$, and GND) and a control bus, referred to as the AMPS control bus. Additionally, AMPS power domains are connected together using a different interface. These components will be described below.

Figure 7A:
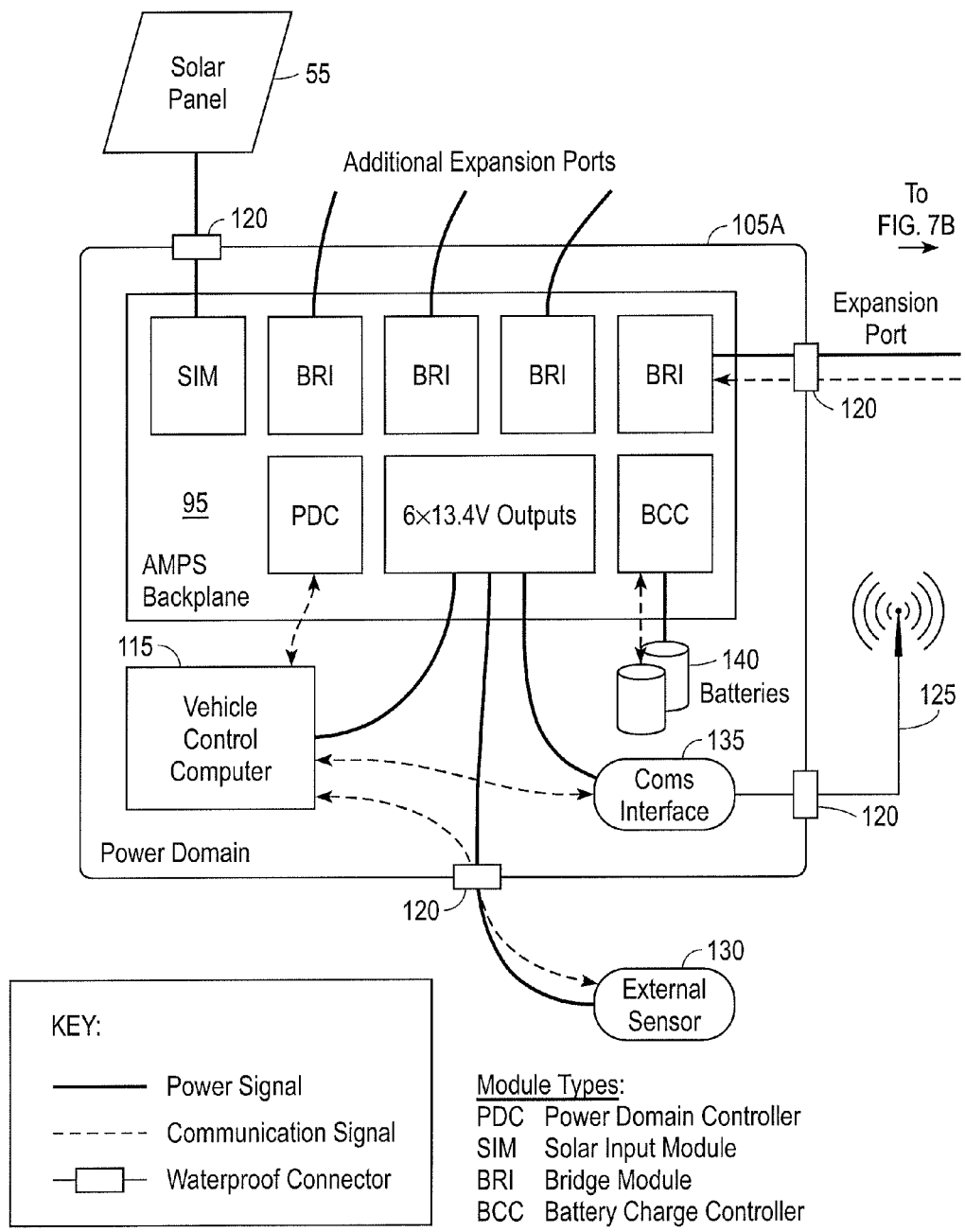
FIGS. 7A and 7B, taken together, show an example of two power domains as might be deployed in an autonomous water vehicle.
Figure 7B:
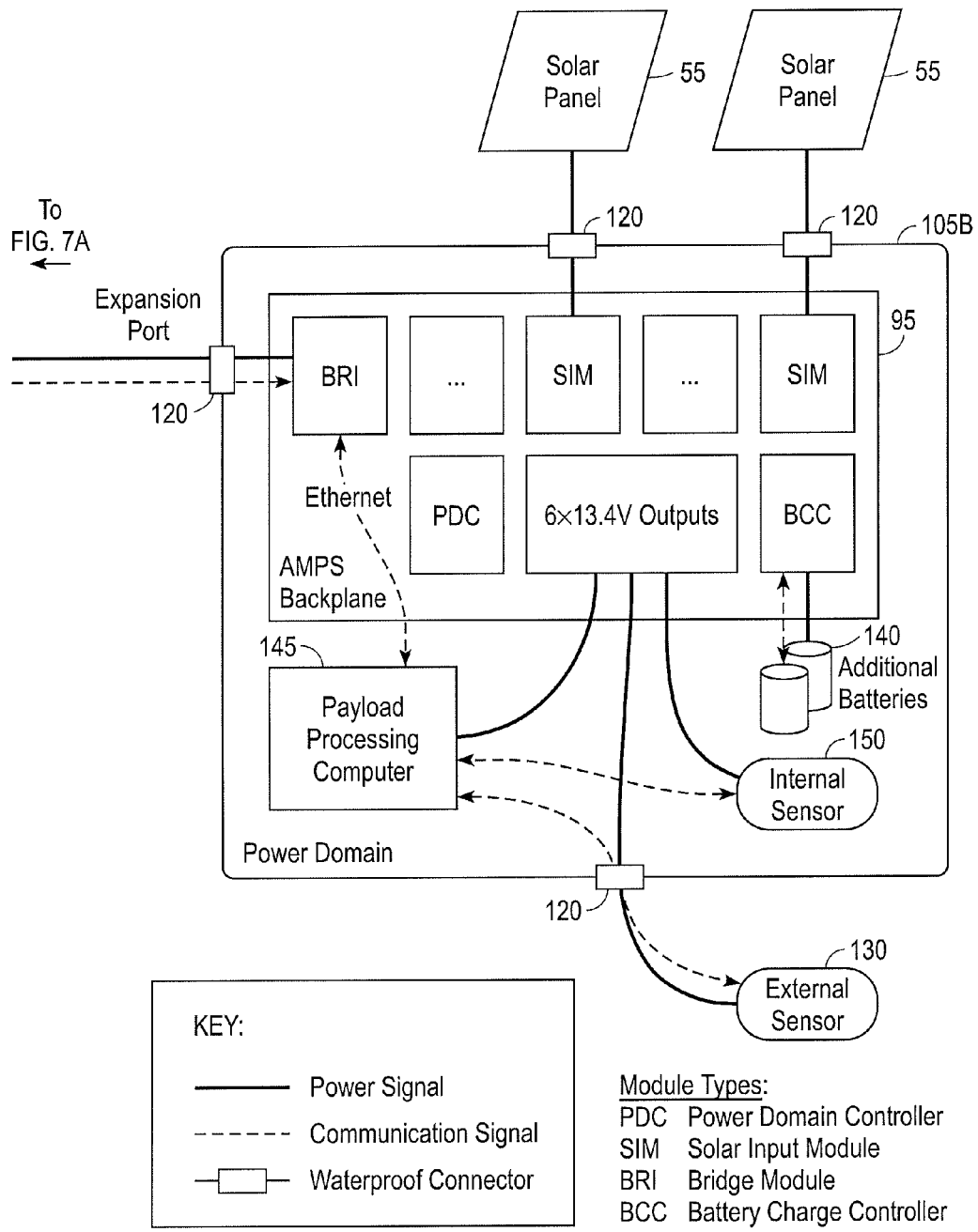

FIGS. 7A and 7B, taken together, show an example of two power domains 105A and 105B as might be deployed in an autonomous water vehicle. Each domain has one or more AMPS backplanes 95 to which are mounted various AMPS modules. The domain in FIG. 7A represents the vehicle's CCU while the domain in FIG. 7B represents an arbitrary payload. Associated with each of the domains are one or more non-AMPS components, which are the functional elements served by that AMPS domain.

The domain in FIG. 7A is the top level domain, and includes a host, which is implemented as part of a vehicle control computer 115. The domain is connected, via waterproof connectors 120, to a solar panel 55, an antenna 125, and an external sensor 130. Also shown as part of the domain are a communications interface 135 and a bank of batteries 140.

The modules include a PDC connected to vehicle control computer (the host), a solar input module (SIM) connected to solar panel 55, a battery charge controller module (BCC) connected to batteries 140, a number of 13.4V regulator modules providing power to the domain's functional components, and one or more bridge modules connected to expansion ports.

The domain in FIG. 7B, not being the top level domain, has no host, but includes a payload processing computer 145. The domain is connected, via waterproof connectors 120, to a pair of solar panels 55, and an external sensor 130. Also shown as part of the domain's functional elements are an internal sensor 150 and a bank of batteries 140. The modules are along the lines of those in the domain of FIG. 7A.

Figure 8:
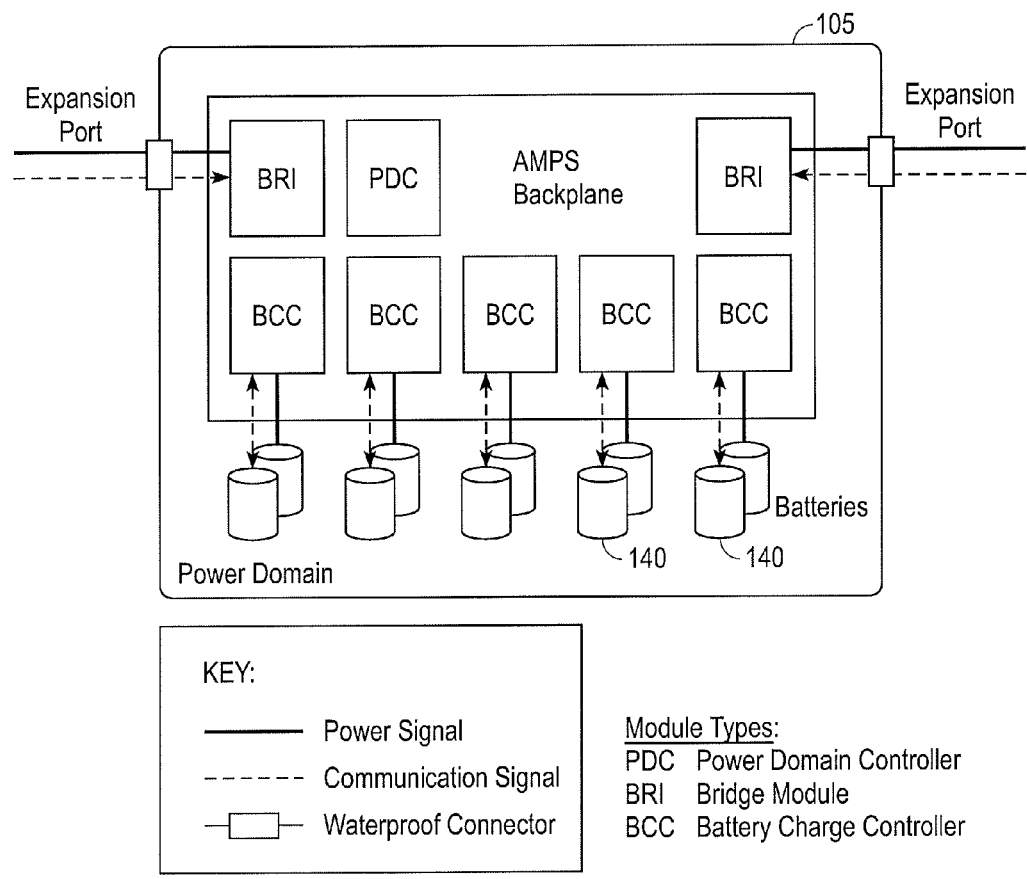
FIG. 8 shows an example of a power domain for an auxiliary battery pack.

FIG. 8 shows an example of a power domain 105 for an auxiliary battery pack. The functional elements are ten batteries 140, the charging and discharging of which are controlled by five BCC modules. As above, the domain includes a PDC and bridge modules that are connected to expansion ports.

FIG. 9 shows, at the right side, a bank of ten batteries, a 5-slot backplane such as backplane 95A of FIG. 5A, and five battery charge controller modules 90_BCC mounted on the backplane. Battery backplane 95A is shown connected to a 16-slot CCU backplane such as backplane 95B of FIG. 5B at the left side of the figure. The two backplanes are interconnected by ordinary cabling by extending the AMPS control bus as described previously.

Because the batteries are in the same power domain that the CCU occupies (and are located in the same payload box, there is no need to use special waterproof cables. If, on the other hand, the batteries and battery charge controller modules were to be deployed in a separate payload box dedicated to providing auxiliary battery power, the internal cabling would communicate with a small backplane containing other modules (e.g., a bridge module and a PDC), and the signals would be communicated to externally facing waterproof connectors for the cable.

AMPS Module Control

FIG. 10 is a block diagram depicting a generic control architecture for AMPS modules. All AMPS modules are presumed to be microprocessor controlled. The function of the microcontroller preferably includes:

querying the module for identification data such as module location, module type, part identifier, and serial number;

enabling and disabling outputs or other module specific functions;

acquiring detailed power usage or generation statistics; and reporting exception conditions to the controller.

To support these functions, the following circuit elements are required:

a mechanism for each module to determine its location in the backplane;

communications between a PDC and the module;

a mechanism to indicate an exception (alert) status to the PDC; and low power operation.

The embodiment of FIG. 10 represents one way of achieving these requirements. A low-power microcontroller (STM32L1xx) 155 is powered from a 3.3V regulator 160 powered from $V_{CONS}$. Note that all modules access the AMPS bus using consumer access for their basic control. Depending on the module's function, its module specific circuitry 165 may or may not use consumer access. In most cases, the current drawn by the microcontroller and associated logic is smaller than the current required to measure the quantity, so the quantity may be accounted for through characterization. The microcontroller supervises the operation of the module specific circuitry which could include monitoring functions, or enabling and disabling circuit elements.

The module communicates to its PDC module 90_PDC (described below) through a 2-wire RS-485 interface. In this system, the PDC is the master, and all other modules are the slaves. Using this approach, the communication signals to all modules can be connected in parallel and a single host UART is required. The modules could also use other point-to-multipoint communications interfaces such as I²C or CAN, or even wireless communications such as 802.15.4 or Bluetooth LE. RS-485 was chosen in the current implementation because its simplicity, its use of differential signaling to reduce the effects of noise, and its low-power characteristics when utilizing suitably low-power drivers at a relatively low bit rate of 16384 bps.

The module address identifies the location of the module in the backplane. It is desirable to unambiguously assign a unique module identifier to each module and to assure that the proper modules are located in the proper slot in the backplane. The simplest way to do this is to use a set of n I/O signals from the microcontroller and selectively ground a subset of the signals and leave the complementary subset floating. The microcontroller can detect which set of signals are grounded and determine up to $2^n$ different addresses. More complex schemes could also be employed such as 3-level logic (grounded, floating, or tied "high") to reduce the number of address lines required at the cost of increased complexity.

Each module can be independently reset from the host in the case of an unrecoverable module error. Because these error events are assumed to be rare, all module resets are connected together so all modules will reset at the same time. Differential signaling was chosen for this function because of its noise immunity.

Module alerts are signaled by a single ESD-protected NFET that pulls down a signal that is detected by the host. Single-ended signaling was considered sufficient because a small number of false-positives (being triggered by noise) would be harmless. In noisier environments, this function could implemented more robustly using a CAN bus transceiver.

A power domain is turned off by means of an On/Off control signal (SYSOFF) controlled by a switch. The on/off switch is always a shorting type connector to ground so this signal is 0V when turned on, and is >5V when turned off. When the power domain is off, no producers can power $V_{PROD}$, no energy storage devices can power $V_{CONS}$, and no bridges can accept any power. Any power domain with producer or storage access should have a power switch to prevent accidental activation. The PDC may hold the SYSOFF signal low for a short time to allow the system to remain activated until the host shuts down.

Any bridge that connects to an external power domain's PDC should be capable of shutting down the CAN interface to downstream power domains. This is because a short circuit on one pair of CAN wires could render the entire CAN network inoperable. Because each bridge needs access to the CAN bus, the CAN bus is extended to every module in the system using a pair of signals on the backplane.

Thus the parallel control bus connecting all of the modules consists of the following signals:

8 signals for module address grounded or left floating;

two signals (differential) for host-to-module communication;

two signals (differential) for module reset as commanded by the host;

one single ended signal (open drain) to indicate a module alert condition;

one system power signal (SYSOFF); and two CAN signals (4 if redundant CAN is used).

In the simplest implementation, power domains would be interconnected using the same signals as those that interconnect the modules. This is problematic for several reasons. First, it requires many signals. As power domains are typically connected through waterproof connectors, the number of signals needs to be minimized. Second, the addresses in the connecting power domains would have to be modified so they do not conflict with the addresses in any other power domain. This would mean that, in general, one could not simply connect one power domain to another without modifying one or the other. A different approach is needed to avoid such complications and costs.

With full-duplex communications between power domains, alerts can be asynchronously generated across power domains eliminating the alert signal. In addition, the reset signal can be generated through a command eliminating the need for the reset signals. Suitable commonly available full-duplex communications standards include I²C, RS-232, RS-422, or CAN. Wireless standards such as 802.11.15 or Bluetooth LE could also be employed. RS-422 and I²C (when implemented differentially) would both require four wires to implement, leaving RS-232 and CAN as the remaining viable candidates. By using CAN repeaters on bridge modules (to be discussed later) for electrical isolation, the entire power system is logically a single CAN network. Using RS-232 would require the bridge module to store and forward the system packets in order to achieve electrical isolation.

CAN, when using CANOpen as the transport protocol, also allows the use of LSS (Layer Setting Services) to dynamically set CAN addresses in the system. Because each power domain is powered on independently through its bridge, the power domains can be energized one at a time, and then configured. Because the host knows which domain was energized, the location of the domain is also known.

In a specific implementation, a common interconnect cable between power domains includes, in addition to the three AMPS power bus conductors:

four conductors for high speed signaling such as fast Ethernet;
two conductors for CAN signaling to control the power domains as discussed below;
two conductors for other purposes such as broadcast communications, serial communications, and the like; and
one conductor for a shield.

This cabling and connector arrangement can be used, even if certain conductors are not required, since the benefits of a universal cable and the possibility of future expansion offset the fact that in some instances, one or more of the conductors will not be used by connected elements.

AMPS Modules

The collection of modules used within a power domain determines its function. Examples of the functions performed with different modules are:

power domain control;
battery charging;
power domain bridging;
solar panel control; and
voltage regulation for instruments and sensors;

FIG. 11 is a block diagram of the power domain controller ("PDC") module 90_PDC. The PDC hardware is the intermediary between the host and the modules within a power domain. As it only draws power from $V_{CONS}$, it only uses consumer access. Power is monitored into the PDC circuitry because the current consumption of this element is expected to be higher than most modules due to the high current requirements of CAN. It communicates with the host system through the CAN interface and with the modules through the RS485 interface. When communicating with the modules, the PDC is always the master. The PDC contains circuitry to control and monitor the SYSOFF signal. If SYSOFF goes high, then the PDC will hold SYSOFF low for a time allowing the host system (if any) to shut down. If redundant CAN is supported, two independent CAN interfaces are needed. Because there must be exactly one power PDC in every power domain and each power domain is housed in its own watertight enclosure, it is convenient to monitor the pressure and temperature inside the enclosure in order to aid in leak detection.

FIG. 12 is a block diagram of a battery charge controller module 90_BCC. The BCC module is designed to control the charge and discharge of two Inspired Energy SMBus smart batteries 140. An LTC1760 charge controller 170 autonomously controls charging the batteries including controlling a buck regulator 175 using the power on $V_{PROD}$. It also autonomously performs power path control diode ORing $V_{PROD}$ and both batteries onto $W_{CONS}$. The autonomous operation of the LTC1760 enhances the reliability of the subsystem. This module combines storage and operational access to the AMPS power bus. The batteries are disconnected from the circuit when the system power is off using solid-state relays to avoid accidental activation. The battery information including battery current and voltage, state of charge, and battery manufacturer's information is read using the SMBus interface.

FIG. 13 is a block diagram of a solar input module 90_SIM. The solar panels used are a series-connected string of individual cells with a maximum power point voltage slightly higher than the maximum charging voltage for the batteries. In this implementation, the output from solar panels 55 is diode ORed directly into $V_{PROD}$. This approach works well as long as the solar panel is relatively unshaded. A different module could be designed to perform maximum power point tracking in cases where shading is an issue. The solar input module uses producer access to access the AMPS power bus. The power generated from the solar panels is measured by the microcontroller over the SMBus interface. When SYSOFF is high, the solar panels are disconnected from the system to assure that the system will not activate accidentally.

As mentioned above, the battery charge controller module combines storage and operational access to the AMPS power bus. Without operational access, which takes energy from $V_{PROD}$ and directs it to $V_{CONS}$, the system would be unable to directly harness energy collected on $V_{PROD}$ once the batteries stopped charging. That is, the additional energy collected on $V_{PROD}$ would not be available to modules using consumer access to take energy from $V_{CONS}$.

In the present implementation, operational access is implemented on the BCC modules because the function is built into the particular battery charge controller IC (LTC1760) that is used on the BCC module. Alternatively, operational access could be incorporated into the solar input modules. There is no fundamental reason that operational access could not be implemented on a module dedicated to that function. However, that is less desirable since such a dedicated operational-access module would need to occupy one or more module slots on the backplane.

FIG. 14 is a block diagram of a 13.4V regulator module 90_Reg. The 13.4 VDC regulator module controls the supply of power to external devices that require well regulated voltage of about 13.4V (12V+10%). To achieve this output voltage from the batteries in the system, a buck-boost regulator 180 is required because the voltage on $V_{CONS}$ ranges from ~12-25V. It uses a single buck-boost regulator followed by an array of measurement elements 185 and load switches 190 that monitor the output power, control the inrush current for capacitive loads, provide current limiting, and provide short-circuit protection. The regulator is not lossless and this must be accounted when reporting measurements for energy usage with different combinations of loads. For this reason, the input to the regulator is measured as well. The 13.4V regulator module accesses the AMPS power bus using consumer access.

FIG. 15 is a block diagram of a load switch module 90_LS. This module controls the supply of power to external devices that are capable of accepting a wide input voltage range (12-25V). The advantage of using the load switch module instead of regulated power modules is potential elimination of multiple levels of voltage regulation that should increase total system efficiency. Each module contains a several power ports and each port is individually controlled, current limited, inrush protected, and monitored. The load switch module accesses the AMPS power bus using consumer access.

FIG. 16 is a block diagram of a bridge module 90(BRI). The bridge module provides circuitry that allows for isolation and current protection of outgoing power on $V_{CONS}$ and $V_{PROD}$, and enables isolation of the CAN interface. An output bridge (closest to the root domain) is always connected to an input bridge. The current limiter and monitor functional block 195 measures current bidirectionally and limits only the outbound current. Because the power domains are connected point-to-point, it is not necessary to limit the incoming current. Even when the bridges are disabled, the module is capable of accepting a limited amount of power through the substrate diode of the NFET as well as an external Schottky diode. The input current is monitored, and if it is greater than a preset limit, then the bridge is unconditionally enabled. Once the bridge is enabled, the diode is bypassed allowing full power to flow bidirectionally. This prevents excessive power dissipation in the diode or NFET.

The external CAN bus is connected to the bridge in one of two ways depending on the direction of the bridge. Output bridges should be able to isolate the downstream CAN bus so a fault in the downstream electronics or cabling will not cause the entire network to shut down. Isolation is implemented by introducing a CAN repeater 200 between the local power domain's CAN bus and the outgoing CAN bus. Input bridges should be able to communicate with CAN even though the bridge is disabled so the CAN repeater should be bypassed.

Dedicated Connector

Another aspect of the invention is a connector system that allows modular payload boxes to interconnect with other modules, with control systems in the vessel, and optionally with other equipment that integrates with one or more AMPS domains when the vessel is on shore or connected to other vessels. The system comprises a male connector and a female connector configured to make electrical contact with each other at a plurality of locations to provide for exchange or relay of power, signaling, control, and/or data exchange in any combination.

Figures 17, 18A:
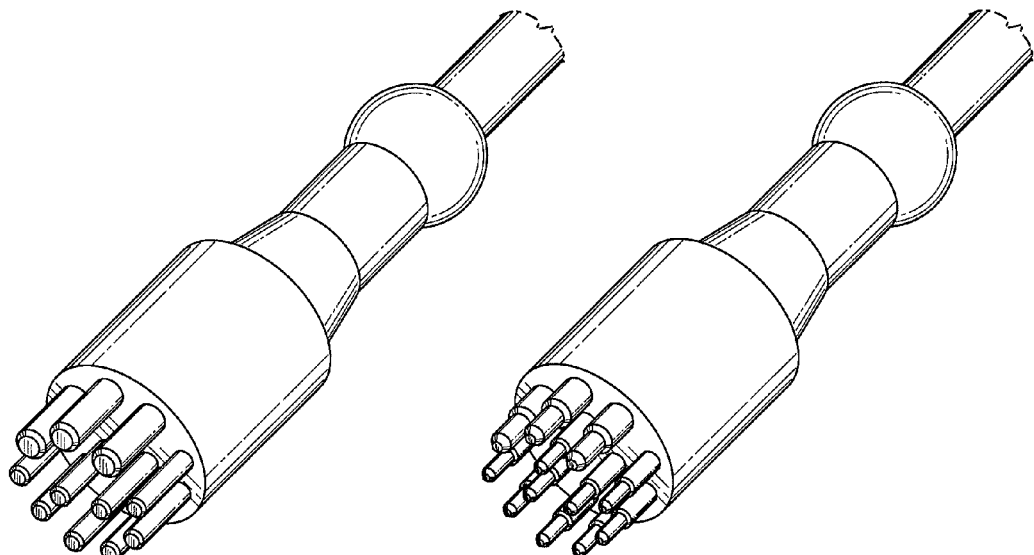
FIG. 17 is an upper perspective view of a male electrical connector, with pins or prongs configured to operably and reversibly engage or couple with a corresponding female connector, thereby operably connecting a payload box to another payload box, control center, or electrical support structure.
FIG. 18A is an upper perspective view of a male electrical connector of this invention, with optional cladding partway down the pins to help form a water-tight seal with a corresponding female connector.

FIG. 17 is a perspective view showing a male connector at the end of a cable that is used for connecting various payload boxes. As can be seen, three of the pins are larger than the other nine. These are the three AMPS power bus conductors. The smaller pins are for the signaling (four conductors for fast Ethernet, two conductors for CAN signaling, and two conductors for serial communications), plus one conductor for the shield. The signaling wires are impedance controlled to facilitate high-speed data transfer. The male connector engages a female connector or socket, thereby electrically connecting lines receding from the pins in the male connector with lines receding from the pin receiving members or receptacles in the female connector.

FIGS. 17 to 21 show possible form features of connectors that are used to connect modules of this invention so that they can functionally interact. Fundamentally, any operable pin shape and arrangement can be used, so long as the pins or prongs in the male connector align with the socket holes of the female connector in such a way that the pins can be reversibly inserted into the socket holes. This joins lines running into the male connector with corresponding lines in the female connector. Lines in the system can be joined so as to electrically and functionally connect one module of the invention with another module, power source, host, or support structure.

The illustrative arrangement or design choice shown in these figures has the pins on a male connector and corresponding socket holes on a female connector that are round in cross-section. The pins and corresponding socket holes are arranged in two concentric circles on the respective connectors. The three AMPS power bus pins are substantially larger in cross-sectional diameter than the other pins, and occupy three adjacent positions in the outer circle of the prong arrangement on a male connector and the socket hole arrangement on a female connector.

FIG. 17 shows an exemplary male electrical connector of this invention, with pins or prongs in the concentric circle arrangement. The housing is made of a waterproof non-conductive material, such as a rubber or thermoplastic, and may be manufactured in any suitable shape. Here, the housing is shown having a substantially cylindrical main portion, a tapered section, and a bulb that can be grasped and pulled by the user and thereby used to help detach a male plug inserted into a female plug. There is also an electrical cable receding from the housing, comprising power wires and signal wires encased in a non-conductive sheath. One such male connector can be connected by the cable to another male connector, such that female connectors residing on two respective modules or components of the system can be interconnected by way of the cable. One such male connector can be connected by cable to a corresponding female connector, for example, to create an extension cord.

Figure 18B:
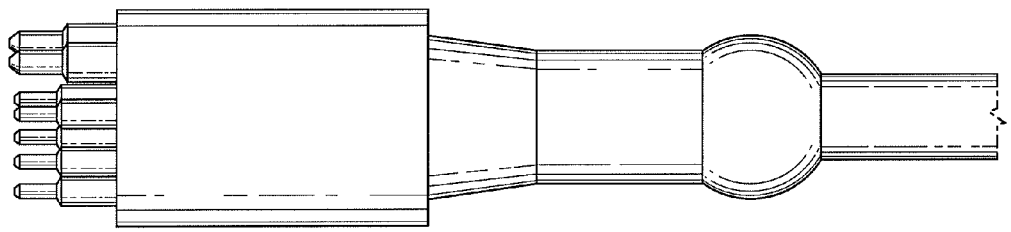
FIG. 18B is a side orthogonal view of a male electrical connector.

FIG. 18A shows another exemplary male electrical connector male electrical connector where the pins or prongs have a cladding part way along their length from the housing. In this configuration, the cladding is made of a non-conductive rubber or thermoplastic material, and helps create a tight waterproof seal with the sides of socket holes on a female connector when inserted therein. FIG. 18B is a longitudinal view of the same male connector.

Figure 19:
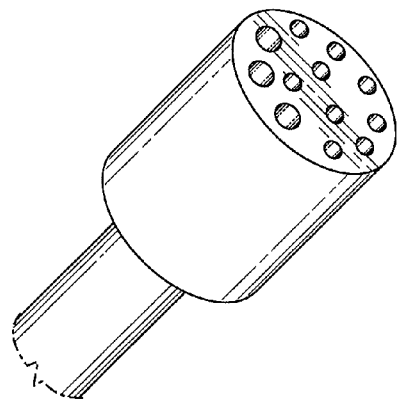
FIG. 19 is an upper perspective view of a female electrical connector of this invention, with socket holes configured to operably and reversibly couple with a corresponding male connector.

FIG. 19 shows a female electrical connector of this invention, with socket holes arranged and configured in a housing with a receding cable such that the socket holes to operably and reversibly engage a corresponding pin on a male connector. The socket holes are arranged in a pattern that is a mirror image to the pins of a reversibly inserted male connector. The pins and the socket holes on the male and female connector, respectively, are each sized and shaped to engage with the corresponding socket hole or pin on the opposing female and male connector. Once engaged, the power and signal lines of the first connector are electrically connected to the corresponding power and signal lines of the second connector. In some deployments of the invention, the housing for the female electrical connector is close to or flush with the surface of a module or other component of the system, such that the visible portion consists essentially of the front face of the female connector, behind which the socket holes perpendicularly project inwards.

The pins and socket holes can also be sized and shaped so as to help form a waterproof seal around each pin—for example, with the socket holes having a diameter that is slightly smaller than the widest diameter of the pins. Alternatively or in addition, the female housing and/or the male housing can be equipped with a collar (not shown) that reversibly engages the housing or collar on the opposing male or female connector, such that when the two connectors are engaged, the collar(s) form a waterproof seal that surrounds the front planar surfaces that oppose each other when the female and male connectors are operably engaged.

Figure 20A:
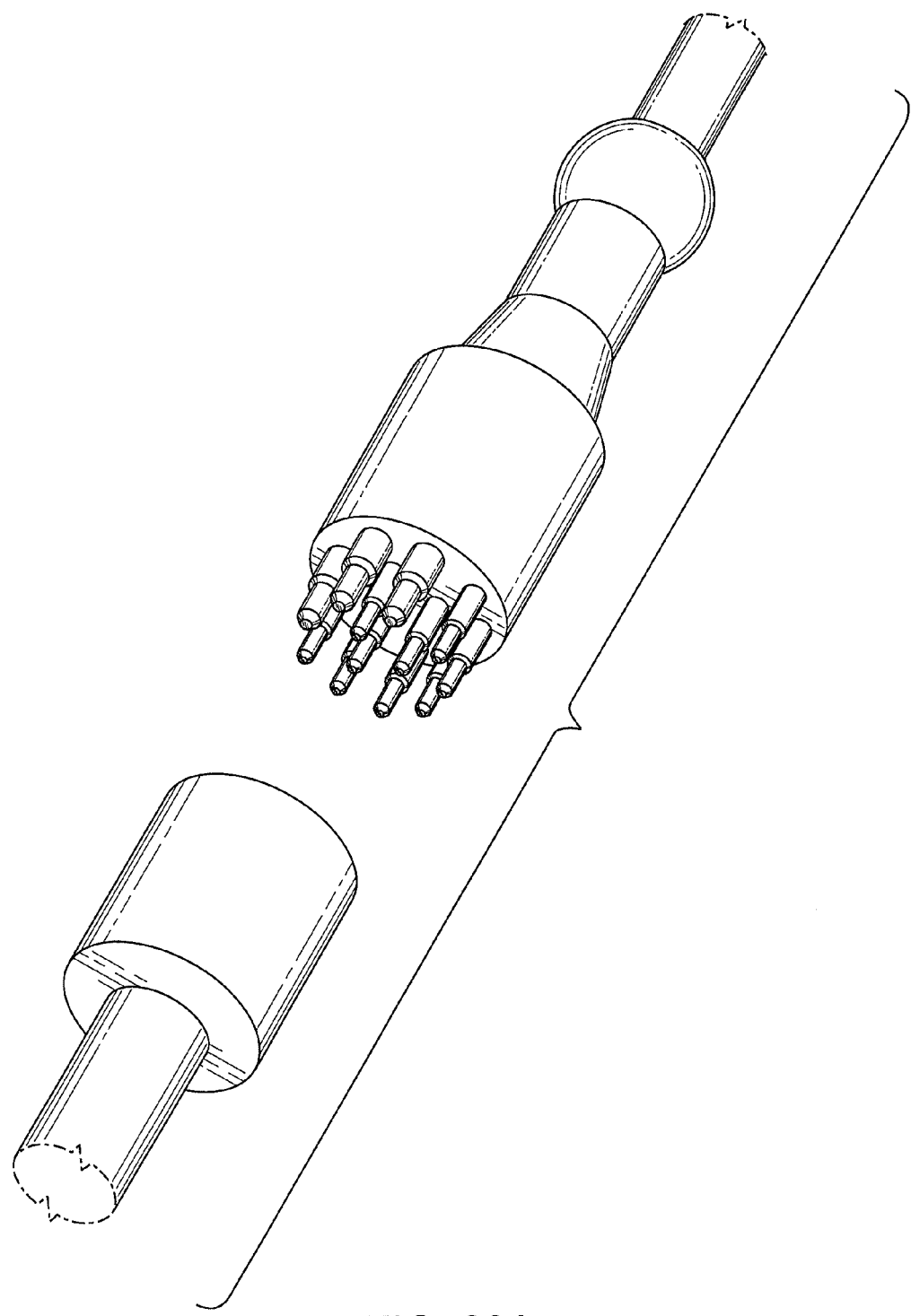
FIGS. 20A and 20B are perspective views showing an aspect of the invention where a male connector is paired with a female connector with corresponding pin and socket hole arrangements on each
Figure 20B:
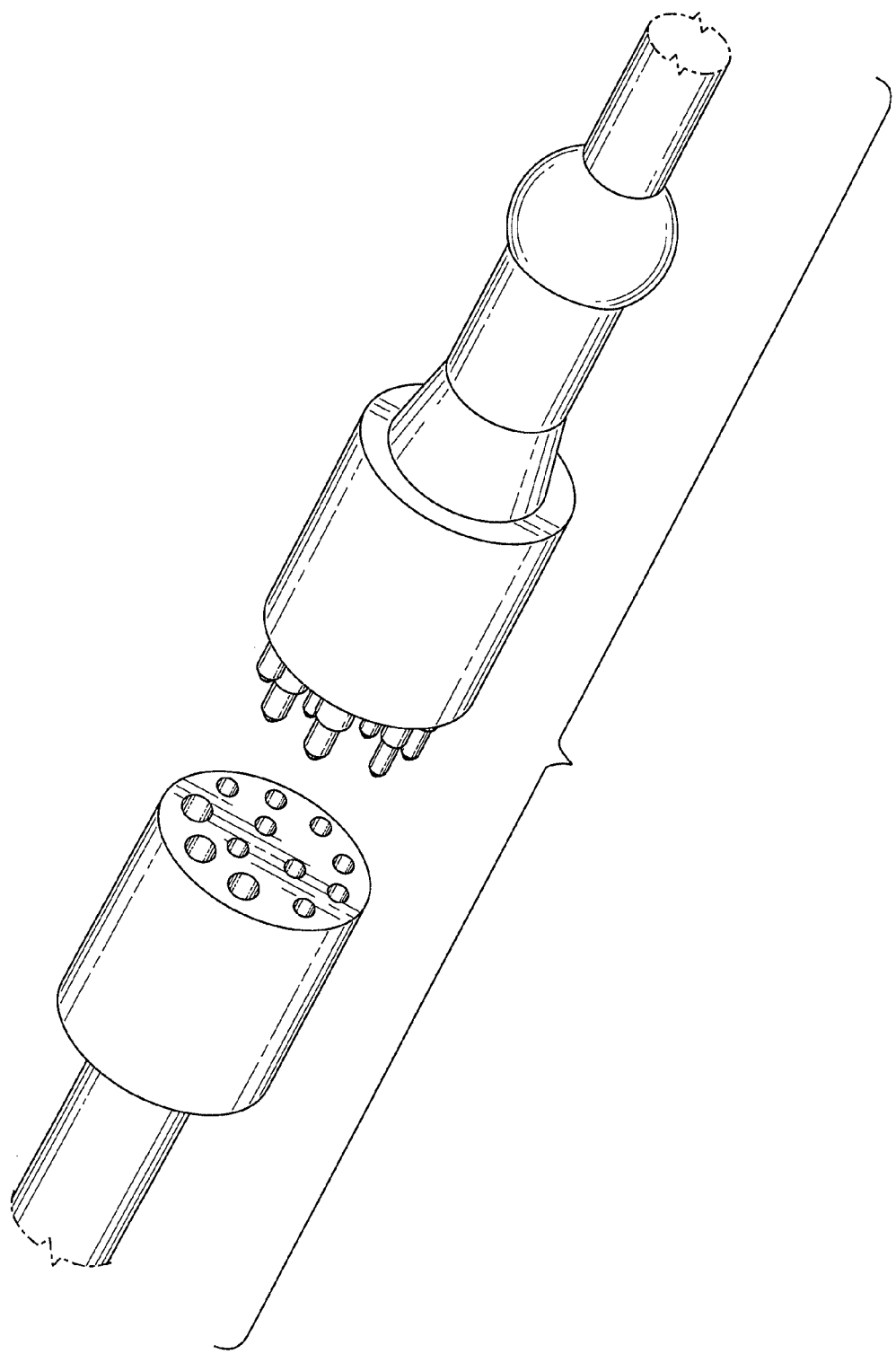
Figure 21:
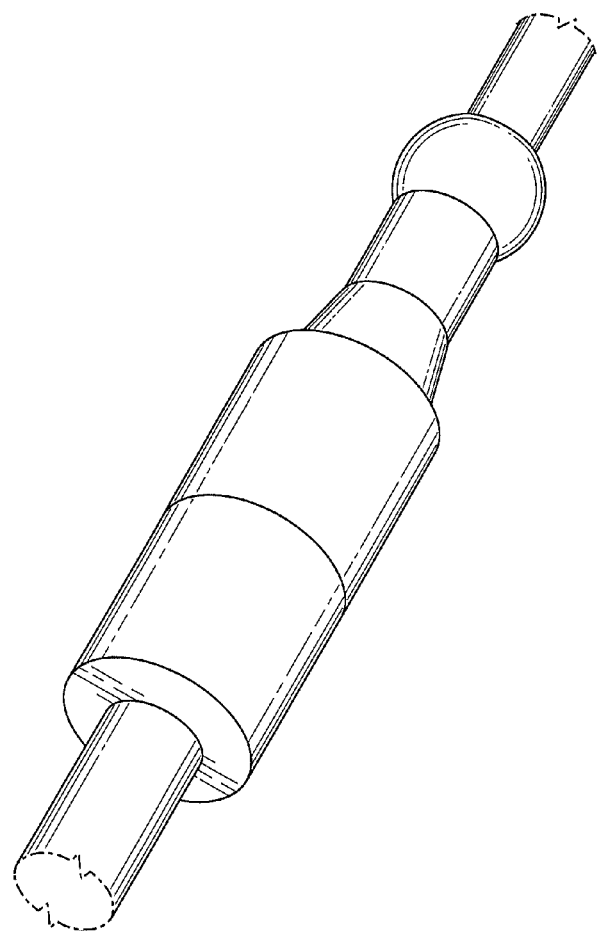
FIG. 21 is a perspective view showing an aspect of the invention where a male connector is operably engaged or coupled with a female connector by inserting the pins of the male connector into the corresponding socket holes of the female connector.

FIGS. 20A, 20B, and 21 show an aspect of the invention comprising a male and female connector in combination, where a male connector is paired with a female connector with arrangements of pin and socket holes that correspond so that the pins of the male connector can be fully pushed into the socket holes of the female connector, thereby electrically joining the respective power or signal lines. In FIGS. 20 and 20B, corresponding male and female connectors are shown separate and aligned with each other. In FIG. 21, the connector pair is shown with the pins of the male connector engaging the socket holes of the female connector such that the front planar surface of the housing of the male and female connectors are adjacent.

Figure 22:
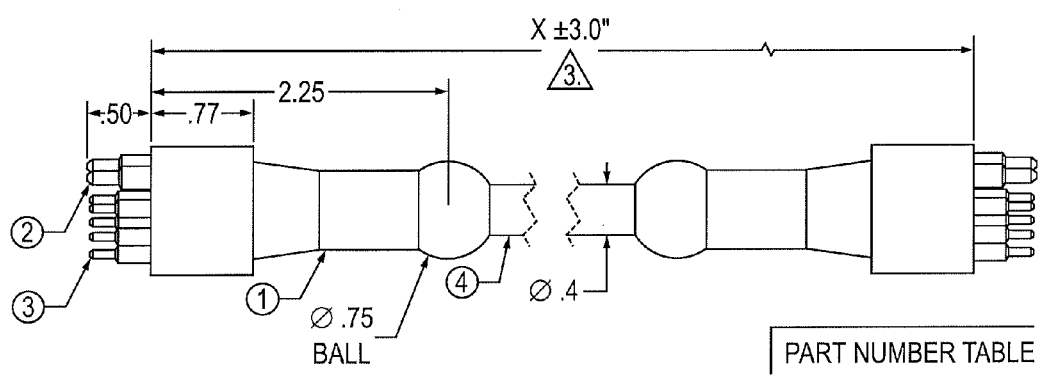
FIG. 22 is a longitudinal view of a cable for interconnecting AMPS power domains with a male connector of this invention at each end adapted for insertion into a female connector that matches the same pin pattern.

FIG. 22 is a longitudinal view of a cable for interconnecting AMPS power domains. The cable comprises a male connector of this invention at each end. Other arrangements include a cable with a male connector on one end and a female connector on the other, and one or more male and female connectors that are directly attached or integral to a payload box an AMPS module or domain. The housing to which the pins are attached is substantially cylindrical in shape, and the pins project from the housing by substantially the same length, which is about 0.5 inches. Alternatively, the pins for conducting power may be shorter or longer than the pins for conducting logic signals.

FIG. 23A is a cross section or surface view of the housing of the male connector across the plane from which the pins project. In this embodiment, the pins for conducting power are thicker or have a larger diameter than the pins for conducting logic signals, and are grouped together on one of the sides of the pin arrangement. Pin 10 is electrically connected to the shielding on the cable. The housing shown in the figure has a diameter of about 1 inch, with the pins arranged in two concentric circles of about 0.8 and 0.3 inches in diameter.

FIG. 23A also depicts the pins as thicker near the base or housing of the male connector. This is because they are clad over part of their length towards the housing with an insulating material. The conducting part of the pins exposed further towards the ends so as to become electrically connected to the receiving member in the female connector. In this fashion, the cladding on each of the pins is configured to form a seal with the corresponding receiving member of the female connector when the male and female connectors are fully engaged. Structurally, the cladding on the pin is shaped in cross-section and sized to conform to the inner surface of the receiving member, which in turn is shaped and sized near the mating surface to conform to the cladding of the pin. Thus, the conducting part of the pin engages the conducting part of the receiving member, completing the circuit, while the cladding of the pin and the inside of the receiving member form the seal, thus rendering the connection waterproof.

FIG. 23B is a chart showing the pinout assignment shown in FIG. 23A, configured to interconnect the power system of the invention as described above.

FIG. 24 is a schematic depiction of electrical lines within the housing. Logic conducting lines 3 to 8 and 11 to 12 are arranged in pairs according to their function.

To prevent ground loops, the shield should be grounded on only one side of the cable. By convention, the shield will be grounded on power domains closest to the root domain.

Modular Payload Box System

Figure 25A:
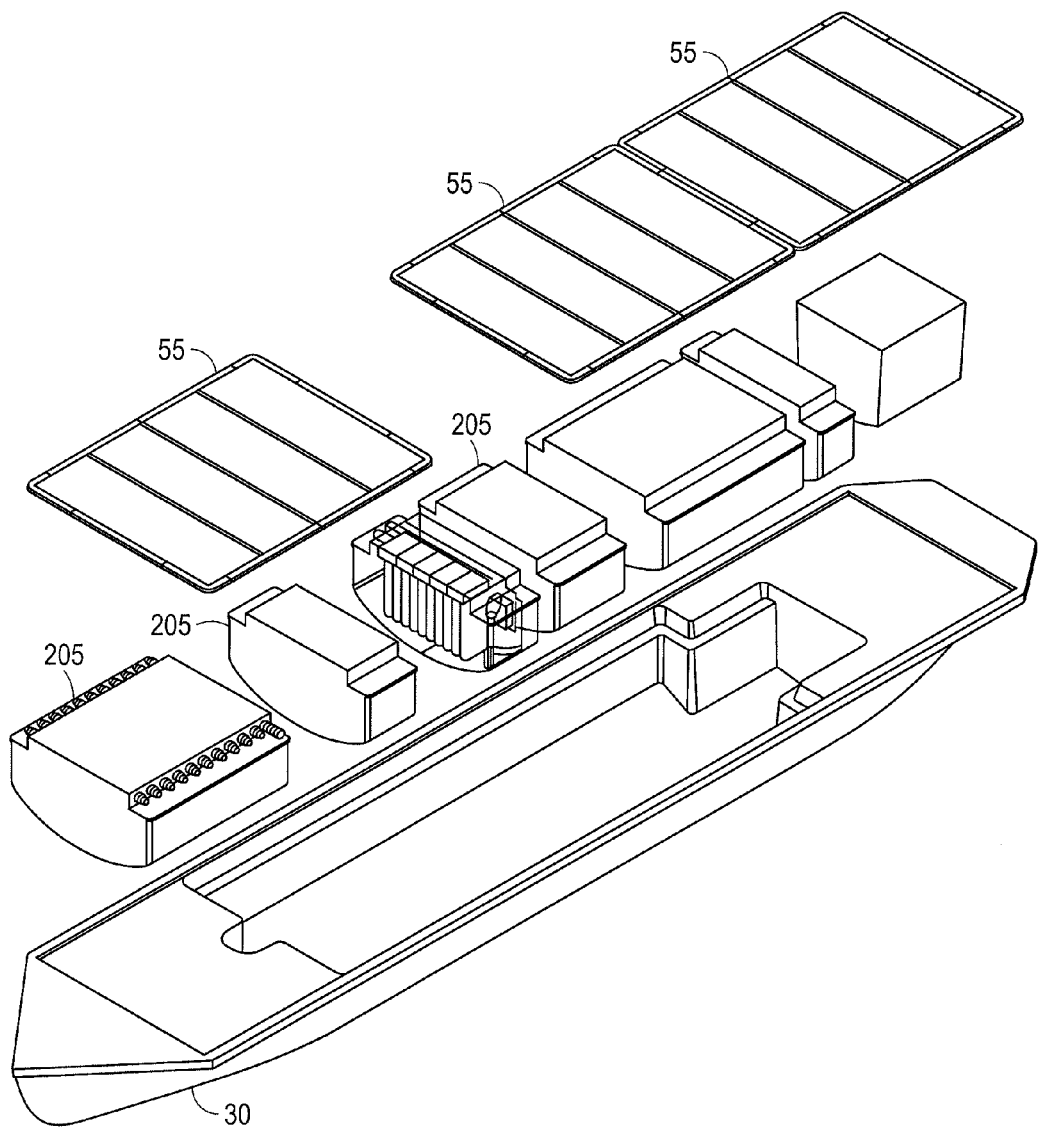
FIGS. 25A and 25B are exploded views of a current embodiment of a WPV hull and modular payload boxes.
Figure 25B:
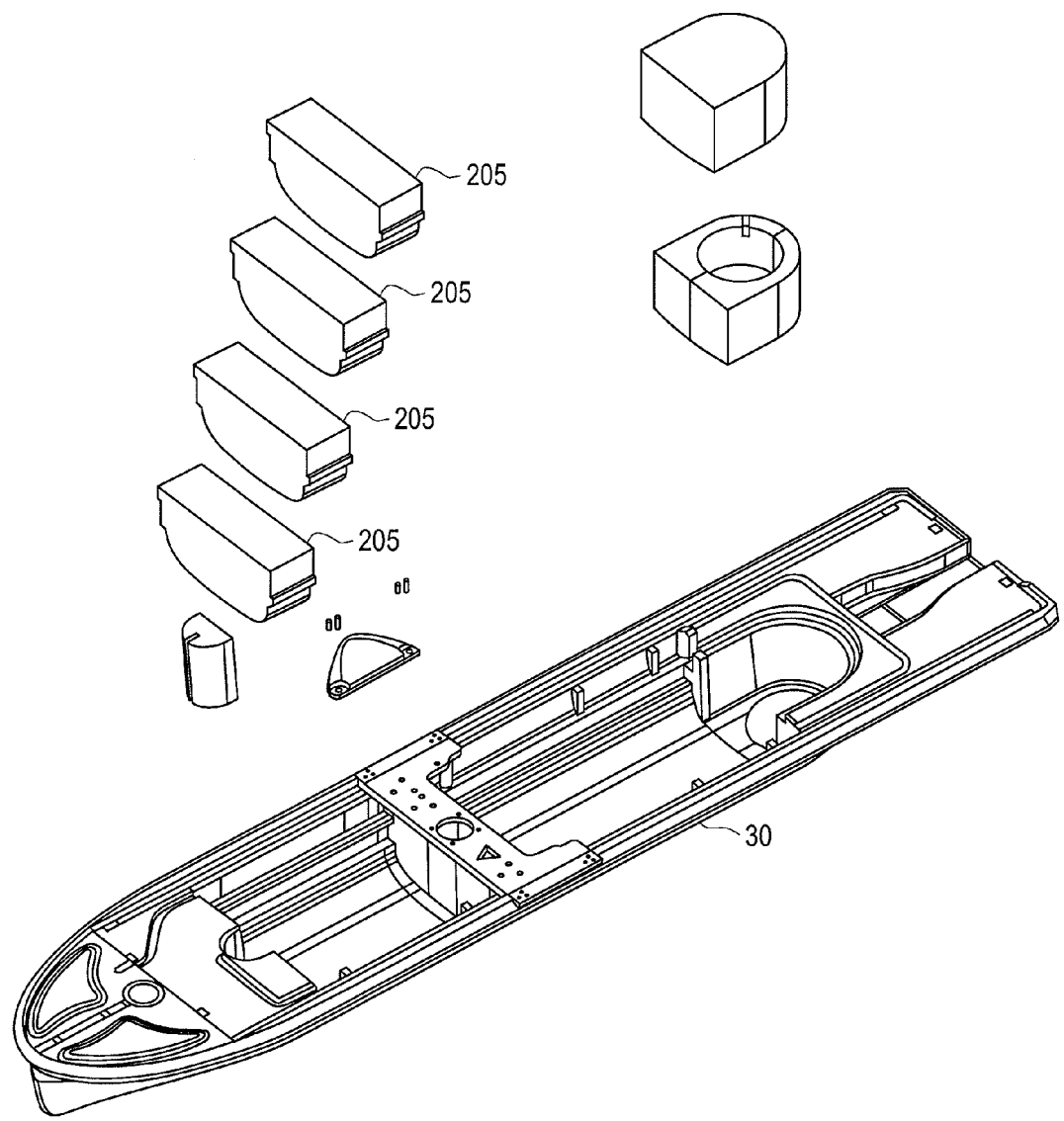
Figure 25C:
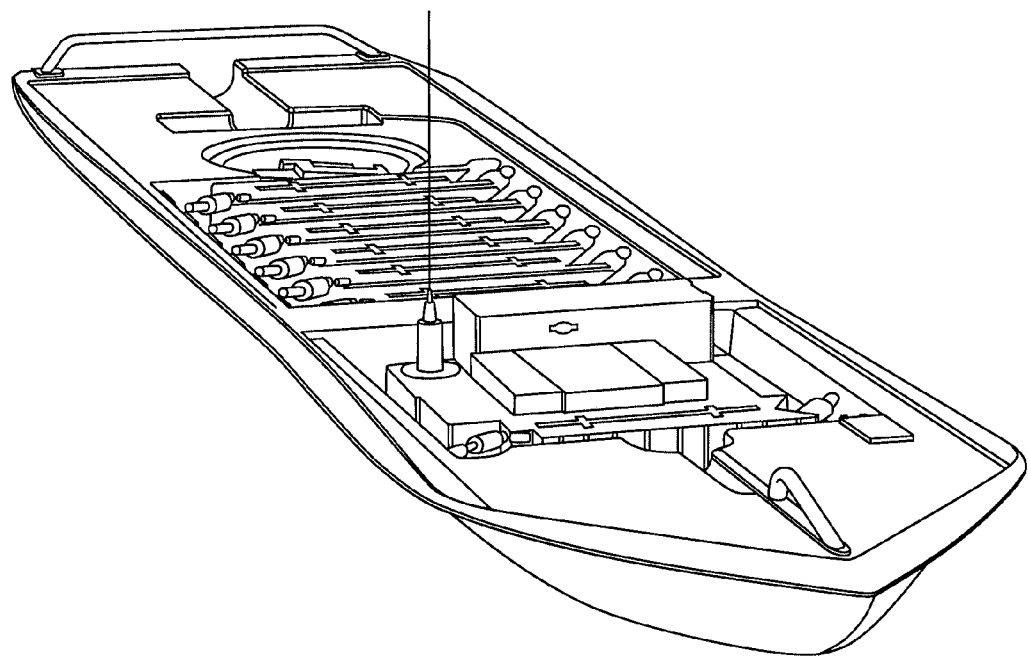
FIGS. 25C and 25D show additional views of a WPV hull and modular payload boxes.
Figure 25D:
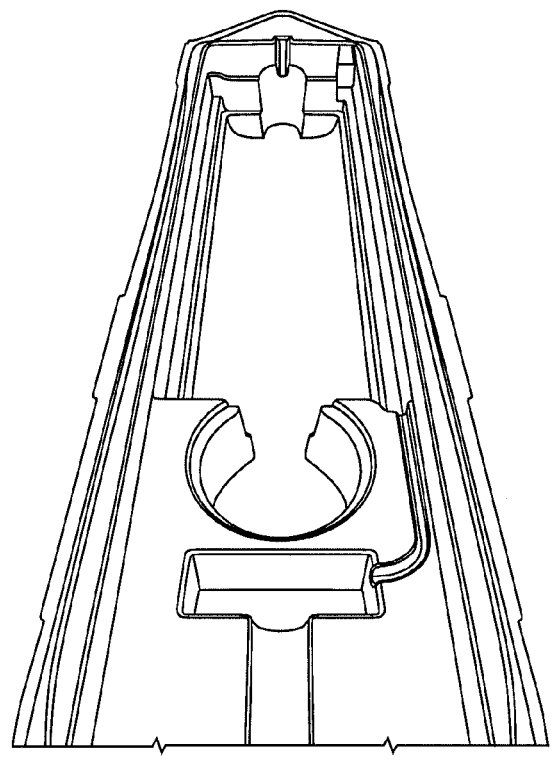

FIGS. 25A and 25B are exploded views of a current embodiment of a WPV hull 30 and modular payload boxes 205 and further shows how payload boxes can be fabricated in lengths (along the hull's axis) that are integral multiples of a modular payload unit ("MPU"). FIG. 25A shows how solar panels 55 would be placed over the payload boxes. FIG. 25B shows some additional construction detail. While dimensions are not critical, it is noted that the hull in this embodiment is about 114 inches (2.9 meters) in length and provides about 3.3 cubic feet (93 liters) of payload space. The basic MPU is about 1 foot. FIGS. 25C and 25D show additional views of a WPV hull and modular payload boxes.

Figure 26A:
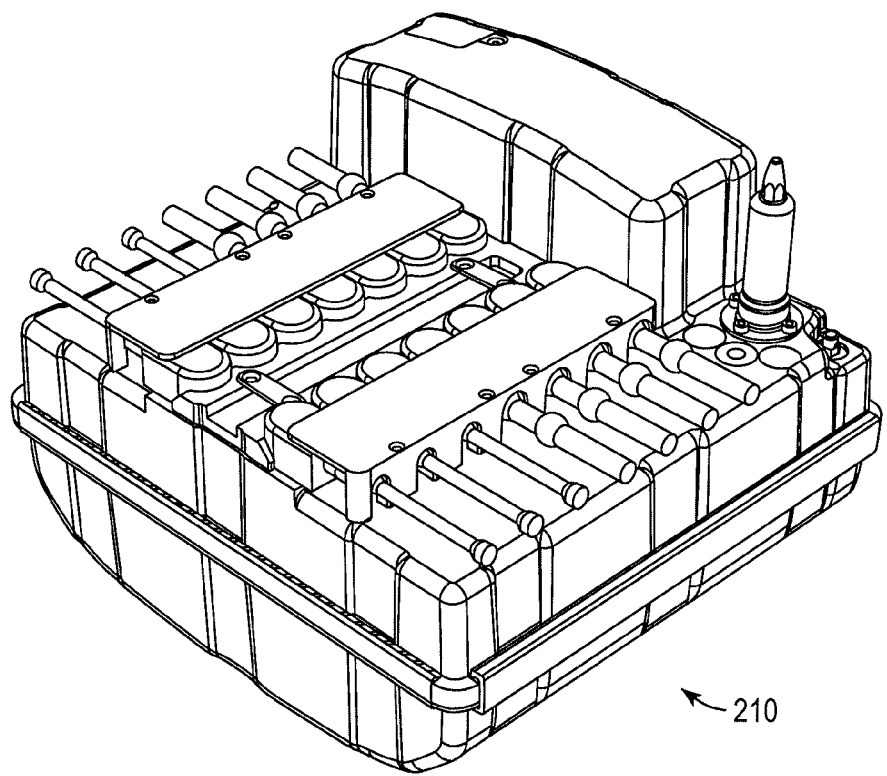
FIG. 26A is a perspective view from the front of a modular payload box configured to hold the WPV's command and control unit ("CCU") electronics.
Figure 26B:
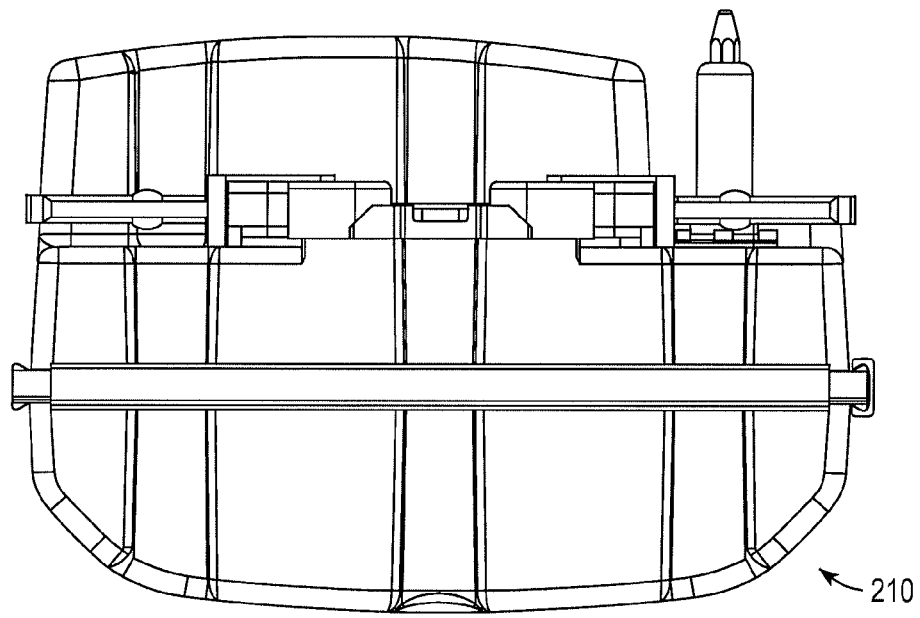
FIG. 26B is front view of the CCU payload box shown in FIG. 26A.
Figure 26C:
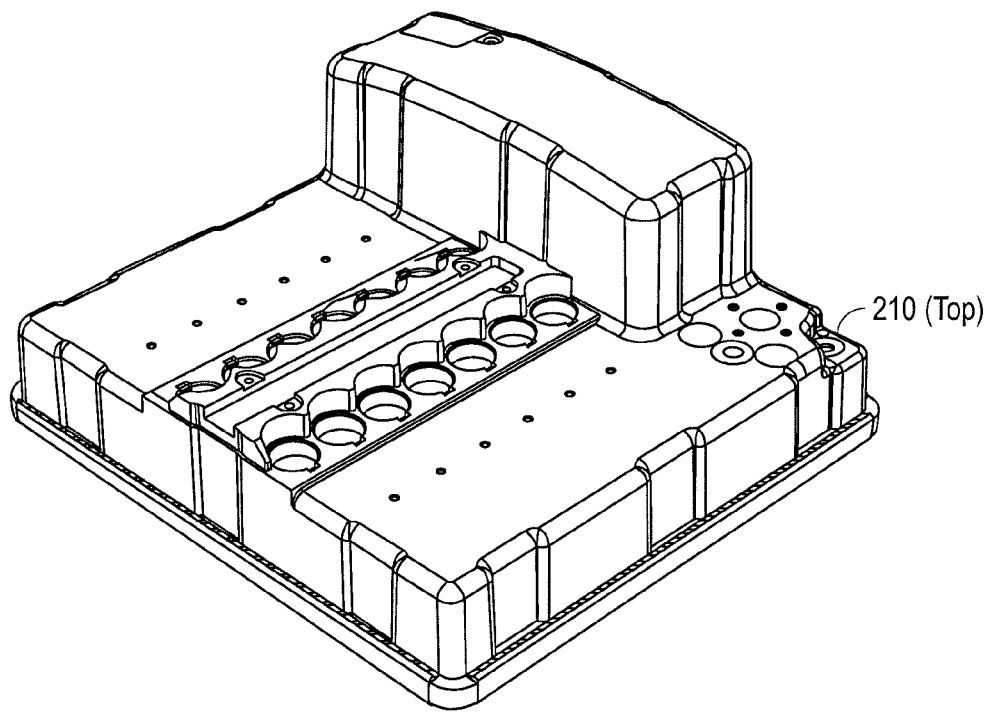
FIGS. 26C and 26D are perspective views of the top and bottom halves of the CCU payload box shown in FIG. 26A.
Figure 26D:
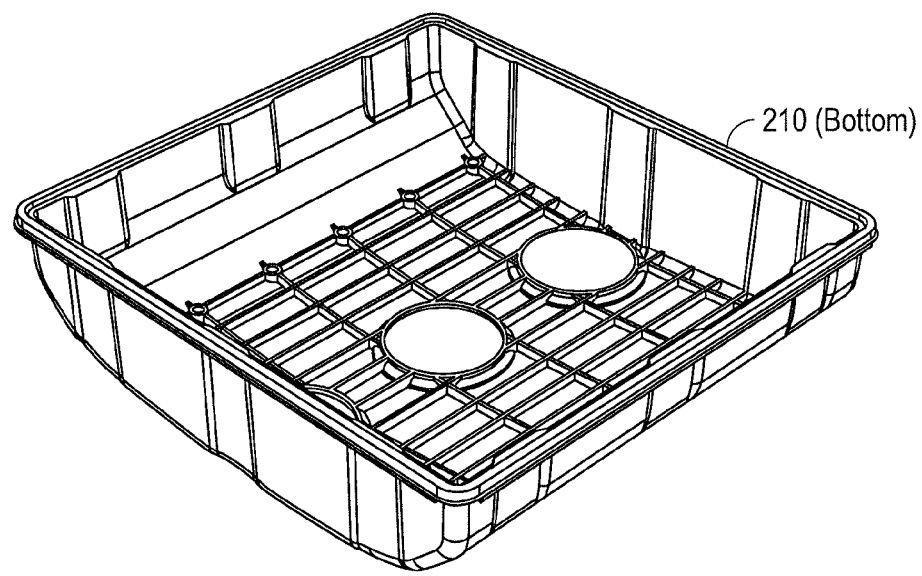
Figure 26E:
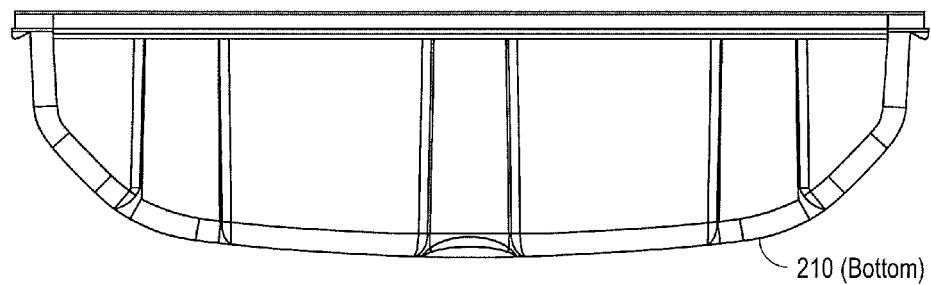
FIGS. 26E and 26F are front and side views of the bottom half of the CCU payload box shown in FIG. 26A.
Figure 26F:
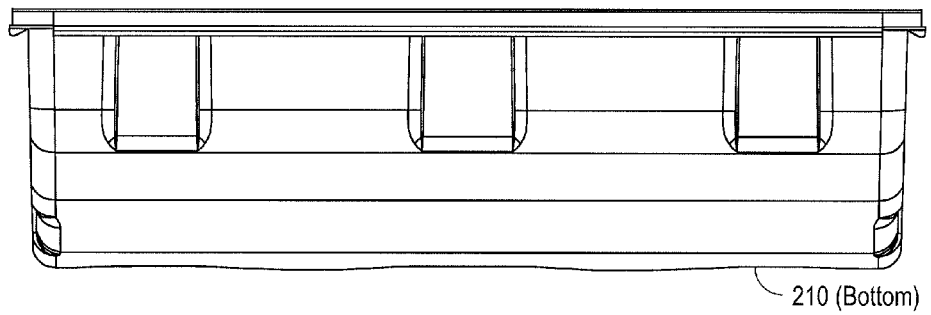

FIG. 26A is a perspective view from the front of a modular payload box 210 configured to hold the WPV's command and control unit ("CCU") electronics, and FIG. 26B is front view of the CCU payload box shown in FIG. 26A. The CCU payload box extends 3 MPU along the hull axis. Also shown are cables for carrying signals to and from the CCU electronics, and the base for one of several antennas that are typically deployed on an autonomous water vehicle. The front view shows the transverse cross section of the lower portion of the modular payload box. FIGS. 26C and 26D are perspective views of the top and bottom halves of the CCU payload box shown in FIG. 26A. FIGS. 26E and 26F are front and side views of the bottom half of the CCU payload box shown in FIG. 26A.

Figure 27A:
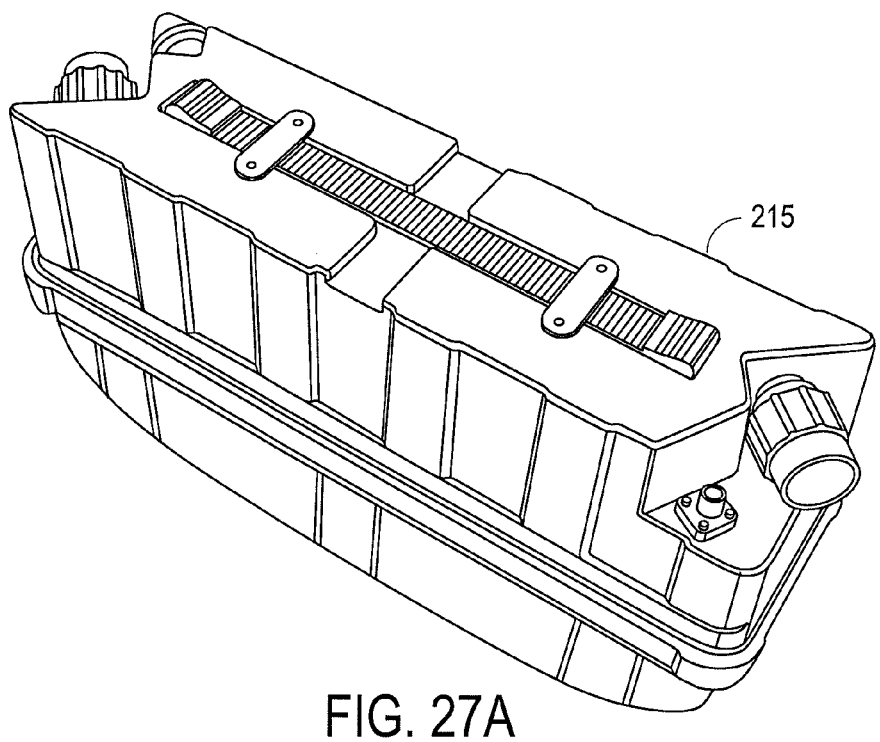
FIG. 27A shows a modular payload box configured to hold a battery pack.
Figure 27B:
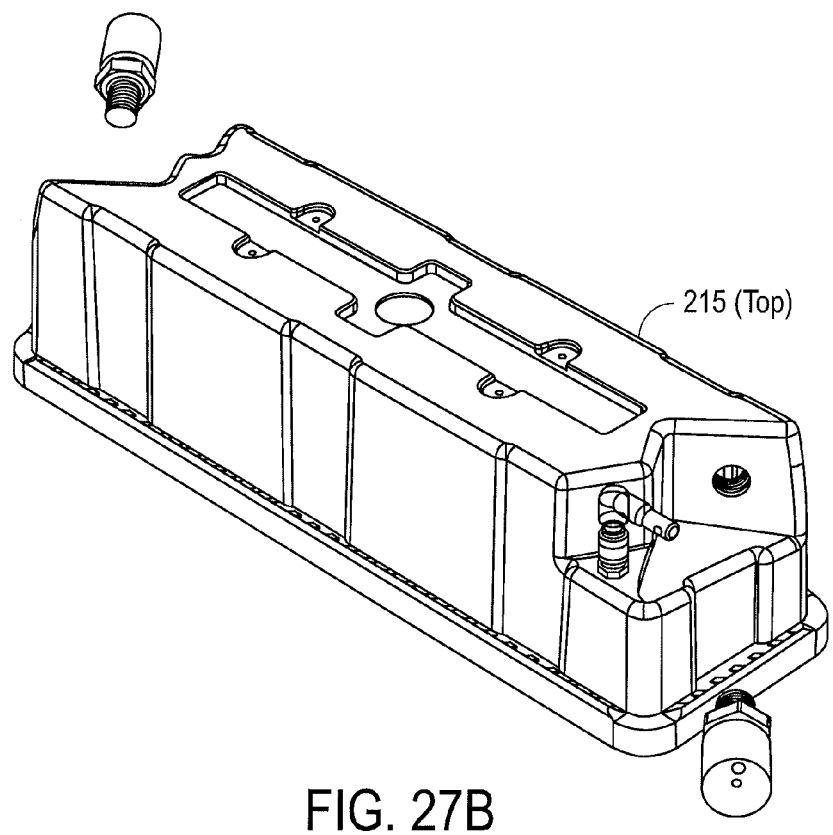
FIGS. 27B and 27C are perspective views of the top and bottom halves of the battery payload box shown in FIG. 27A.
Figure 27C:
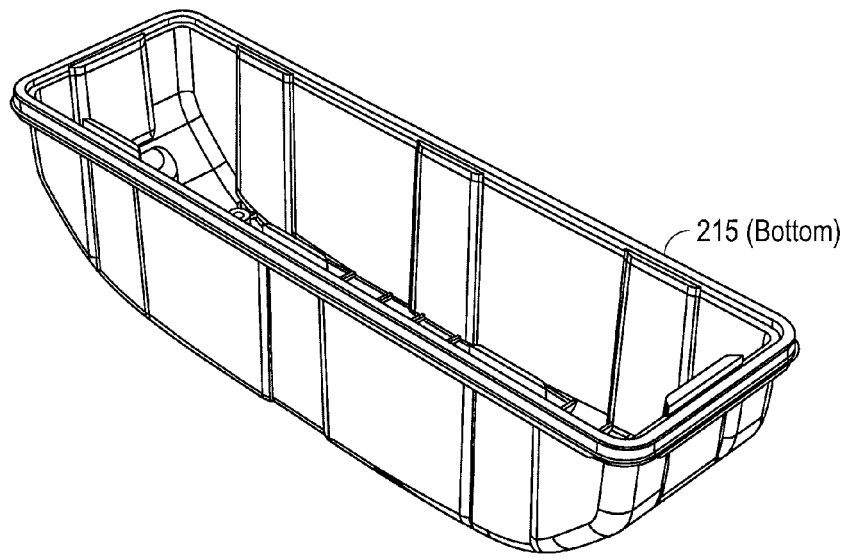
Figure 27D:
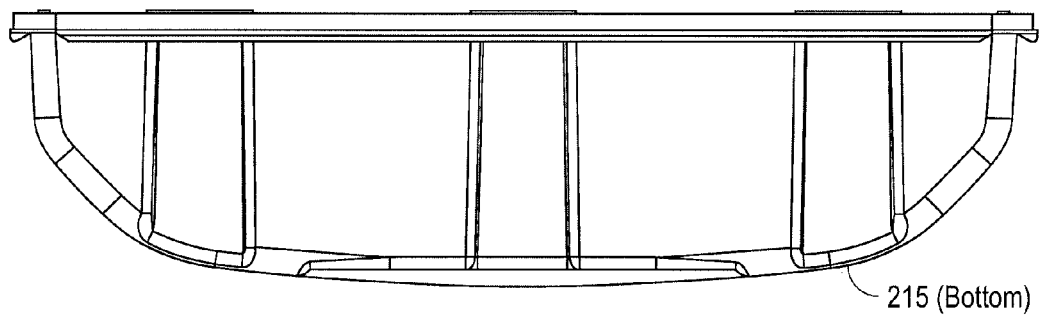
FIGS. 27D and 27E are front and side views of the bottom half of the battery payload box shown in FIG. 27A.
Figure 27E:
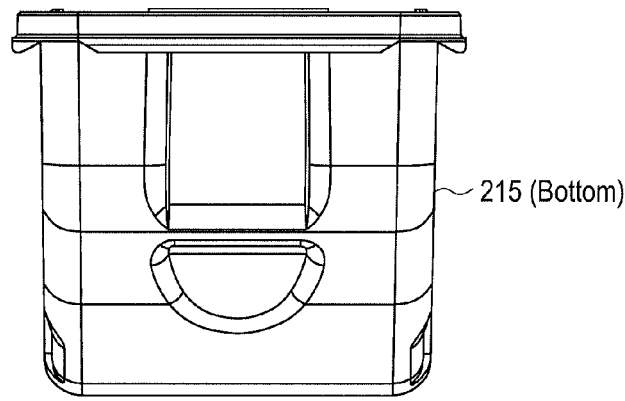

FIG. 27A shows a modular payload box 215 configured to hold a battery pack, and FIGS. 27B and 27C are perspective views of the top and bottom halves of the battery payload box shown in FIG. 27A. The battery payload box extends 1 MPU along the hull axis. FIGS. 27D and 27E are front and side views of the bottom half of the modular payload box shown in FIG. 27A. As can be seen, the lower portion of battery payload box 215 has substantially the same transverse cross section as that of the CCU payload box. Suitable materials for the payload boxes include molded reinforced plastic resins. A current choice is 30% glassed filled plastic resin sold under the trade name Noryl by SABIC Innovative Plastics Holding BV. Alternative materials are aluminum, and ABS.

CONCLUSION

In conclusion, it can be seen that embodiments of the invention provide a flexible and scalable power management and distribution system. This can be enhanced by a modular payload box system.

While the above is a complete description of specific embodiments of the invention, the above description should not be taken as limiting the scope of the invention as defined by the claims.

What is claimed is:

1. A power system for an autonomous water vehicle, the system comprising:
   a three-line power bus having a producer voltage line, a consumer voltage line, and a ground line;
   a backplane carrying the power bus and including a plurality of connectors;
   a plurality of modules, referred to as AMPS modules, each AMPS module being coupled to the backplane by a respective connector, the AMPS modules including at least one module chosen from the set that includes:
consumer modules having circuitry for coupling an electrical load to the consumer voltage line;
producer modules having circuitry for coupling an electrical power source to the producer voltage line; and
bridge modules having circuitry for coupling to the producer and consumer voltage lines on the backplane and for limiting outbound current on corresponding producer and consumer voltage output lines.

2. A power system for an autonomous water vehicle, the system comprising:
a three-line vehicle power bus having a producer voltage line, a consumer voltage line, and a ground line;
a backplane carrying the power bus and including a plurality of connectors;
a plurality of modules, referred to as AMPS modules, each AMPS module being coupled to the backplane by a respective connector, the AMPS modules including at least one consumer module having circuitry for coupling an electrical load to the consumer voltage line.

3. A power system for an autonomous water vehicle, the system comprising:
a three-line vehicle power bus having a producer voltage line, a consumer voltage line, and a ground line;
a backplane carrying the power bus and including a plurality of connectors;
a plurality of modules, referred to as AMPS modules, each AMPS module being coupled to the backplane by a respective connector, the AMPS modules including at least one producer module having circuitry for coupling an electrical power source to the producer voltage line.

4. A power system for an autonomous water vehicle, the system comprising:
a three-line vehicle power bus having a producer voltage line, a consumer voltage line, and a ground line;
a backplane carrying the power bus and including a plurality of connectors;
a plurality of modules, referred to as AMPS modules, each AMPS module being coupled to the backplane by a respective connector, the AMPS modules including at least one bridge module having circuitry for coupling to the producer and consumer voltage lines on the backplane and for limiting outbound current on corresponding producer and consumer voltage output lines.

5. A power system for an autonomous water vehicle, the system comprising:
a three-line power bus having a producer voltage line, a consumer voltage line, and a ground line;
a plurality of modules, referred to as AMPS modules, each AMPS module being coupled to the power bus, the AMPS modules including at least one module chosen from the set that includes:
consumer modules having circuitry for coupling an electrical load to the consumer voltage line;
producer modules having circuitry for coupling an electrical power source to the producer voltage line; and
bridge modules having circuitry for coupling to the producer and consumer voltage lines and for limiting outbound current on corresponding producer and consumer voltage output lines;
wherein:
the modules are distributed over a number of power domains; and
each power domain includes a bridge module for coupling the power bus in that power domain to a different power domain, the bridge module also providing signaling to the different power domain.

6. The power system of claim 1 wherein the set of AMPS modules includes a battery charger module that has circuitry for:
coupling to the producer voltage line to charge a battery; and
coupling to the consumer voltage line to OR the battery voltage onto the consumer voltage line.

7. The power system of claim 1 wherein the set of AMPS modules includes a battery charger module.

8. The power system of claim 1 wherein the producer module is a solar input module.

9. The power system of claim 1 wherein:
the plurality of connectors are arranged on a grid; and
the AMPS modules are implemented on circuit boards having sizes compatible with the grid spacing.

10. The power system of claim 1 wherein the system includes multiple power domains with each power domain having a distinct backplane.

11. The power system of claim 1 wherein:
the AMPS modules are distributed over a number of power domains; and
the AMPS modules include a power domain controller for each power domain.

12. The power system of claim 1 wherein:
a first power domain is located on a hull of the autonomous water vehicle; and
a second power domain is located on a structure below the water and coupled to the first power domain via an underwater cable.

13. The power system of claim 2 wherein:
the plurality of connectors are arranged on a grid; and
the AMPS modules are implemented on circuit boards having sizes compatible with the grid spacing.

14. The power system of claim 3 wherein:
the plurality of connectors are arranged on a grid; and
the AMPS modules are implemented on circuit boards having sizes compatible with the grid spacing.

15. The power system of claim 4 wherein:
the plurality of connectors are arranged on a grid; and
the AMPS modules are implemented on circuit boards having sizes compatible with the grid spacing.

16. The power system of claim 5 wherein:
the set of AMPS modules includes a battery charger module that has circuitry for:
coupling to the producer voltage line to charge a battery; and
coupling to the consumer voltage line to OR the battery voltage onto the consumer voltage line.

17. The power system of claim 5 wherein the producer module is a solar input module.

18. The power system of claim 5 wherein:
each power domain comprises a backplane that carries the power bus and includes a plurality of connectors arranged on a grid; and
the AMPS modules are implemented on circuit boards having sizes compatible with the grid spacing.

19. The power system of claim 5 wherein the AMPS modules include a power domain controller for each power domain.

20. The power system of claim 5 wherein:
a first power domain is located on a hull of the autonomous water vehicle; and a second power domain is located on a structure below the water and coupled to the first power domain via an underwater cable.

* * * * *